(12) United States Patent
Fukuda

(10) Patent No.: US 7,383,496 B2
(45) Date of Patent: Jun. 3, 2008

(54) INFORMATION PROCESSING APPARATUS, PROGRAM, AND RECORDING MEDIUM

(75) Inventor: Kentaro Fukuda, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 10/847,721

(22) Filed: May 18, 2004

(65) Prior Publication Data
US 2004/0243936 A1    Dec. 2, 2004

(30) Foreign Application Priority Data
May 30, 2003    (JP)    ............................. 2003-155256

(51) Int. Cl.
*G06F 17/00*    (2006.01)
(52) U.S. Cl. ....................... 715/230; 715/255
(58) Field of Classification Search ................ 715/500, 715/512, 513, 530, 200, 230, 234, 255; 709/203, 709/206, 224, 227; 707/102
See application file for complete search history.

(56) References Cited

U.S. PATENT DOCUMENTS

| | | | | |
|---|---|---|---|---|
| 5,224,038 | A * | 6/1993 | Bespalko ..................... | 715/531 |
| 5,347,625 | A * | 9/1994 | Kajimoto et al. ........... | 715/539 |
| 5,526,443 | A * | 6/1996 | Nakayama .................. | 382/229 |
| 5,659,766 | A * | 8/1997 | Saund et al. ................... | 704/9 |
| 5,680,628 | A * | 10/1997 | Carus et al. ................... | 704/1 |
| 5,802,381 | A * | 9/1998 | Matsumoto et al. ........ | 715/517 |
| 5,893,127 | A * | 4/1999 | Tyan et al. .................. | 715/513 |
| 5,935,210 | A * | 8/1999 | Stark .......................... | 709/224 |
| 5,935,219 | A * | 8/1999 | Holmes ....................... | 719/315 |
| 6,057,842 | A * | 5/2000 | Knowlton et al. .......... | 715/788 |
| 6,178,417 | B1 * | 1/2001 | Syeda-Mahmood ............ | 707/3 |
| 6,185,550 | B1 * | 2/2001 | Snow et al. ................... | 707/1 |
| 6,484,156 | B1 * | 11/2002 | Gupta et al. ................... | 707/1 |

(Continued)

FOREIGN PATENT DOCUMENTS

JP    2002-245068    8/2002

(Continued)

OTHER PUBLICATIONS

H. Takagi, C. Asakawa, K. Fukuda, J. Maeda, "Site-wide Annotation: Reconstructing Existing Pages to be Accessible", ASSET2002.

*Primary Examiner*—Doug Hutton
*Assistant Examiner*—James H Blackwell
(74) *Attorney, Agent, or Firm*—Richard M. Goldman; Shimokaji & Associates, P.C.

(57) ABSTRACT

An information processing apparatus for classifying documents. The apparatus begins with an input document, and detects related documents. Next, the apparatus converts the document components into element identifying information that indicates the type or role of the document component. In the next stage, an internal document sequence converting section converts each set of repetitive element identifying information into element identifying information indicating the sequence of the element identifying information. Next, an inter-document sequence converting section identifies sets of element identifying information that appear in both a target document and a related document. An inter-document sequence converting section detects the identified sets of element identifying information which appear repeatedly in the target document. Then, a sequence converting identifies information into element identifying information, indicating the sequence of the elements, and structures the target document.

20 Claims, 14 Drawing Sheets

U.S. PATENT DOCUMENTS

| | | | |
|---|---|---|---|
| 6,493,637 B1* | 12/2002 | Steeg | 702/19 |
| 6,565,609 B1* | 5/2003 | Sorge et al. | 715/503 |
| 6,684,257 B1* | 1/2004 | Camut et al. | 709/246 |
| 6,757,870 B1* | 6/2004 | Stinger | 715/513 |
| 6,769,096 B1* | 7/2004 | Kuppusamy et al. | 715/530 |
| 6,826,724 B1* | 11/2004 | Shimada et al. | 715/500 |
| 6,877,137 B1* | 4/2005 | Rivette et al. | 715/512 |
| 6,895,551 B1* | 5/2005 | Huang et al. | 715/513 |
| 6,922,726 B2* | 7/2005 | Basson et al. | 709/227 |
| 6,941,509 B2* | 9/2005 | Harris | 715/501.1 |
| 6,941,513 B2* | 9/2005 | Meystel et al. | 715/530 |
| 6,944,665 B2* | 9/2005 | Brown et al. | 709/227 |
| 6,978,419 B1* | 12/2005 | Kantrowitz | 715/511 |
| 6,981,246 B2* | 12/2005 | Dunn | 717/127 |
| 6,988,240 B2* | 1/2006 | Grober et al. | 715/501.1 |
| 7,003,722 B2* | 2/2006 | Rothchiller et al. | 715/513 |
| 7,028,250 B2* | 4/2006 | Ukrainczyk et al. | 715/500 |
| 7,047,236 B2* | 5/2006 | Conroy et al. | 707/3 |
| 7,047,255 B2* | 5/2006 | Imaichi et al. | 707/104.1 |
| 7,069,501 B2* | 6/2006 | Kunitake et al. | 715/513 |
| 7,080,067 B2* | 7/2006 | Nonomura et al. | 707/3 |
| 7,111,011 B2* | 9/2006 | Kobayashi et al. | 707/102 |
| 7,137,067 B2* | 11/2006 | Yanase et al. | 715/530 |
| 2001/0027460 A1* | 10/2001 | Yamamoto et al. | 707/536 |
| 2002/0013792 A1* | 1/2002 | Imielinski et al. | 707/523 |
| 2002/0029232 A1* | 3/2002 | Bobrow et al. | 707/517 |
| 2002/0065857 A1* | 5/2002 | Michalewicz et al. | 707/532 |
| 2002/0069223 A1* | 6/2002 | Goodisman et al. | 707/513 |
| 2002/0083096 A1* | 6/2002 | Hsu et al. | 707/513 |
| 2002/0124025 A1* | 9/2002 | Janakiraman et al. | 707/526 |
| 2002/0124056 A1* | 9/2002 | Dutta et al. | 709/218 |
| 2003/0020754 A1* | 1/2003 | Berman | 345/767 |
| 2003/0079183 A1* | 4/2003 | Tada et al. | 715/515 |
| 2003/0234822 A1* | 12/2003 | Spisak | 345/827 |
| 2004/0003028 A1* | 1/2004 | Emmett et al. | 709/203 |
| 2004/0034836 A1* | 2/2004 | Ikeno | 715/530 |
| 2004/0090439 A1* | 5/2004 | Dillner | 345/440 |
| 2004/0103371 A1* | 5/2004 | Chen et al. | 715/513 |
| 2004/0148568 A1* | 7/2004 | Springer | 715/513 |
| 2004/0148571 A1* | 7/2004 | Lue | 715/514 |
| 2004/0181746 A1* | 9/2004 | McLure et al. | 715/500 |
| 2004/0205614 A1* | 10/2004 | Keswa | 715/523 |
| 2004/0205670 A1* | 10/2004 | Mitsugi | 715/531 |
| 2006/0015578 A1* | 1/2006 | Banerjee et al. | 709/219 |
| 2006/0161986 A1* | 7/2006 | Singh et al. | 726/24 |

FOREIGN PATENT DOCUMENTS

JP     2003-085087     3/2003

* cited by examiner

| Element identifying information | Document component |
|---|---|
| <digit /> | Numerical value |
| <longtext /> | String with 100 letters or more |
| <midtext /> | String with 30 to 100 letters |
| <shorttext /> | String with 2 to 30 letters |
| <letter /> | One letter |
| <in-largeimg /> | Image present in the same site as that of target document information and having 300 × 300 pixels or more |
| <in-midimg /> | Image present in the same site as that of target document information and having 100 × 100 to 300 × 300 pixels |
| <in-smallimg /> | Image present in the same site as that of target document information and having 100 × 100 pixels or less |
| <out-largeimg /> | Image present in site different from that of target document information and having 300 × 300 pixels or more |
| <out-midimg /> | Image present in the site different from that of target document information and having 100 × 100 to 300 × 300 pixels |
| <out-smallimg /> | Image present in site different from that of target document information and having 100 × 100 pixels or less |
| <samedir-link>···<br></samedir-link> | Link to the same directory as that of target document information |
| <in-link>···<br></in-link> | Link to the same site of that of target document information |
| <out-link>···<br></out-link> | Link to site different from that of target document information |

FIGURE 8

| | | Nine or more { | | | | | | |
|---|---|---|---|---|---|---|---|---|
| (<letter /> \| <shorttext />) or [(<\*-link> (<letter /> \| <shorttext />) </\*-link>] | <digit /> | ... | <digit /> | <letter /> \| <shorttext /> | <digit /> | <letter /> \| <shorttext /> | <digit /> | <letter /> \| <shorttext /> |
| (<letter /> \| <shorttext />) or [(<\*-link> (<letter /> \| <shorttext />) </\*-link>] | <digit /> | ... | <digit /> | | <digit /> | | <digit /> | |

- Death in accident on ~ Highway. Road temporarily closed between xx Town and ○○ City (21:56)

- Japanese found dead in river in AA City. Investigations started in terms of both murder and accident (21:18).

- Governor BB renounces bonds corresponding to ○○○-hundred-million-yen loans to Company ×× (20:13)

(b)

```
<bullet /><in-link><midtext /></in-link><new-line />

<bullet /><in-link><midtext /></in-link><new-line />

<bullet /><in-link><midtext /></in-link><new-line />
```

FIGURE 11

INFORMATION PROCESSING APPARATUS, PROGRAM, AND RECORDING MEDIUM

BACKGROUND OF THE INVENTION

1. Field of the Invention

The present invention relates to an information processing apparatus, a program, and a recording medium. In particular, the present invention relates to an information processing apparatus that classifies the contents of document information, and a program and a recording medium for this information processing apparatus.

2. Background Art

In a World Wide Web (WWW) system such as the Internet, a transcoding technique has hitherto been used to allow mentally handicapped people, the aged, and the like to browse web pages comfortably. For transcoding, information such as annotations added to a web page can be used to rearrange the contents of the web page according to their types or create a table of contents for the web page. Thus, mentally handicapped people, the aged, and the like advantageously browse web pages.

Certain knowledge is required to appropriately add annotations for transcoding. Furthermore, a large amount of work is required to add annotations. Thus, techniques have been proposed to support the addition of annotations (see, e.g., Published Unexamined patent application No. 2003-85087, Published Unexamined patent application No. 2002-245068, and H. Takagi, C. Asakawa, K. Fukuda, J. Maeda, "Sitewide Annotation: Reconstructing Existing Pages to be Accessible", ASSET2002) For example, the technique described in Published Unexamined patent application No. 2002-245068 can classify a web page on the basis of the structure and characteristics of tags which determine the layout of the web page.

However, the above technique cannot appropriately classify the contents of web pages the structures of which vary dynamically. For example, if a web page contains a baseball scoreboard, entrant players, and a list of the players' records, the web page may be constantly updated and varied dynamically. In this case, the above technique cannot determine whether the layout of the web page has changed or the scoreboard, any entrant player's record, or the like has changed in connection with the progress of a baseball game. Thus, a clear need exists to provide an information processing apparatus, a program, and a recording medium which can solve the above problems.

SUMMARY OF THE INVENTION

It is thus an object of the present invention to provide an information processing apparatus, a program, and a recording medium which can solve the above problems. This object is accomplished by combining the characteristics described in the independent claims. Furthermore, the dependent claims define further advantageous specific examples of the present invention.

According to a first aspect of the present invention, there is provided an information processing apparatus that classifies a plurality of document components contained in document information, into a plurality of groups, the apparatus comprising a component converting section that converts each of said plurality of document components in the document information into element identifying information indicating the type or role of the document component, an intra-document pattern of sequence converting section that processes the document information converted by the component converting section to convert each of the sets of pieces of element identifying information that appears repeatedly at a predetermined threshold frequency or higher, into the element identifying information indicating a pattern of sequence of the set of the element identifying information, and a group classifying section that processes document information obtained by allowing the intra-document pattern of sequence converting section to convert the document information repeatedly, to group a plurality of the document components converted into a corresponding piece of element identifying information by the intra-document pattern of sequence converting section. The first aspect also provides a program controlling this information processing apparatus and a recording medium in which this program is recorded.

One example of our invention is an information processing apparatus that classifies a plurality of document components contained in document information, into a plurality of groups, the apparatus comprising a component converting section that converts each of the plurality of document components in the document information into element identifying information indicating the type or role of the document component, an intra-document pattern of sequence converting section that processes the document information converted by the component converting section to convert each of the sets of pieces of element identifying information that appear repeatedly at a predetermined threshold frequency or higher, into the element identifying information indicating a pattern of sequence of the set of the element identifying information, and a group classifying section that processes document information obtained by repeated conversions by the intra-document pattern of sequence converting section to group a plurality of the document components converted into a corresponding piece of element identifying information by the intra-document pattern of sequence converting section.

A further example of our invention is a program for controlling an information processing apparatus that classifies a plurality of document components contained in document information, into a plurality of groups, the program allowing the information processing apparatus to function as a component converting section that converts each of the plurality of document components in the document information into element identifying information indicating the type or role of the document component, an intra-document pattern of sequence converting section that processes the document information converted by the component converting section to convert each of the sets of pieces of element identifying information that appear repeatedly at a predetermined threshold frequency or higher, into the element identifying information indicating a pattern of sequence of the set of the element identifying information, and a group classifying section that processes document information obtained by repeated conversions by the intra-document pattern of sequence converting section to group a plurality of the document components converted into a corresponding piece of element identifying information by the intra-document pattern of sequence converting section.

The above summary of the present invention does not list all the required characteristics of the present invention. A subcombination of this group of characteristics can also constitute the present invention.

THE FIGURES

FIG. 8 is a table showing an example in which a component converting section 105 converts document components into element identifying information;

FIG. 9 is a table showing an example in which the component converting section 105 converts a predetermined set of pieces element identifying information into different element identifying information;

FIG. 11(a) is a view of another example of a display screen displayed by document information, and FIG. 11(b) is a view showing the results of the conversion by the intra-document pattern of sequence converting section 130 of the document information causing the display of the display screen shown in FIG. 11(a);

DETAILED DESCRIPTION OF THE INVENTION

The present invention will be described below through its embodiment. However, the embodiment described below does not limit the invention according to the claims. Furthermore, all the combinations of characteristics described in the embodiment are not essential to the solution of the present invention.

Figure 1:
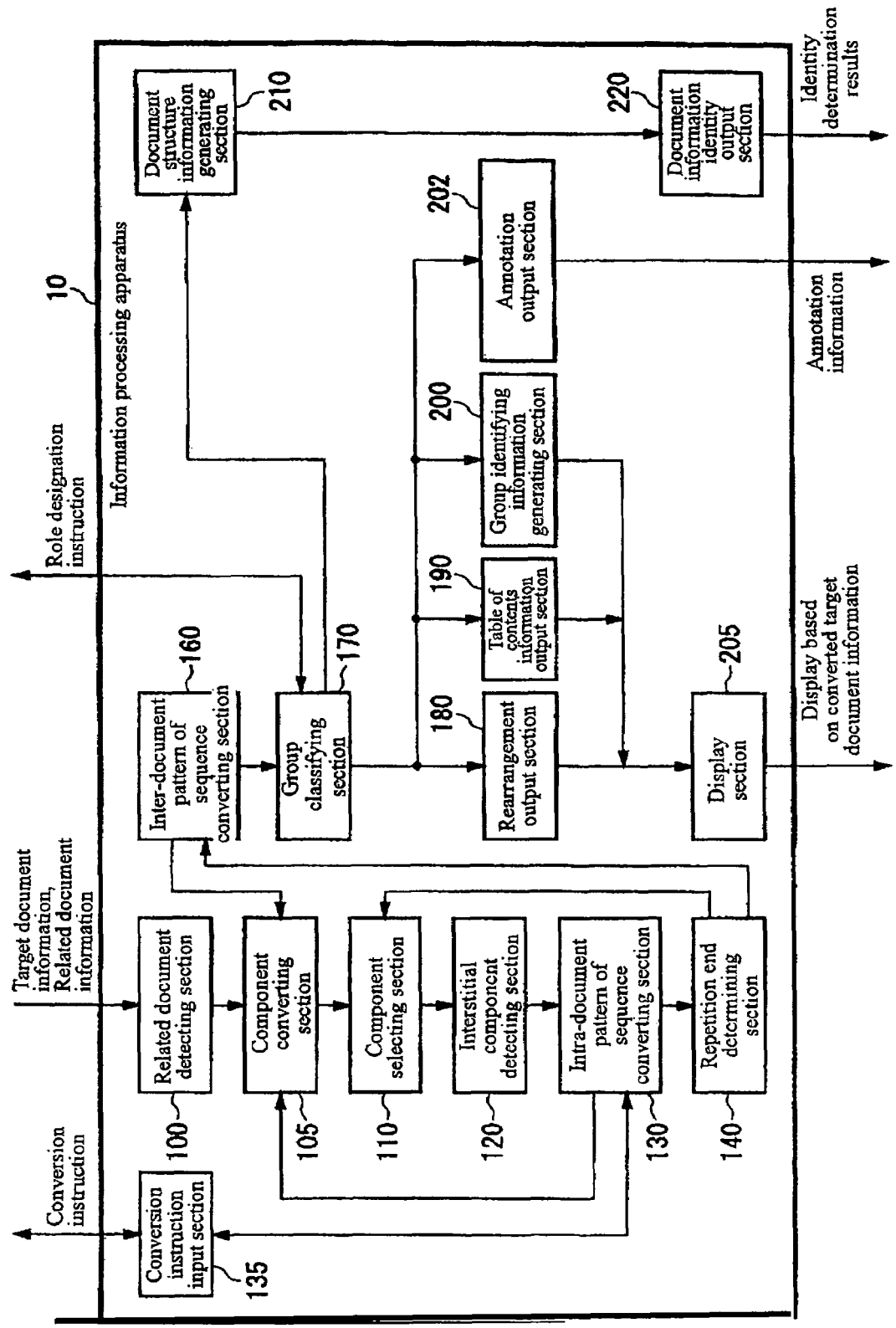
FIG. 1 is a functional block diagram of an information processing apparatus 10.

FIG. 1 is a functional block diagram of an information processing apparatus 10. The information processing apparatus 10 processes document information on a tagged document in HTML or the like to group plural document components contained in the document information. Specifically, in the present embodiment, the information processing apparatus 10 processes an HTML document acquired from a WWW server or the like to group and display tag information and the like contained in the document information. Alternatively, the information processing apparatus 10 may be a server apparatus such as a WWW server that classifies information from an HTML document in response to a request from a web browser or the like to return the classified information to the web browser.

The information processing apparatus 10 comprises a related document detecting section 100, a component converting section 105, a component selecting section 110, an interstitial component detecting section 120, an intra-document pattern of sequence converting section 130, a conversion instruction input section 135, a repetition end determining section 140, an inter-document pattern of sequence converting section 160, a group classifying section 170, a rearrangement output section 180, a table of contents information output section 190, a group identifying information generating section 200, an annotation output section 202, a display section 205, a document structure information generating section 210, and a document information identity output section 220.

On acquiring target document information to be grouped, the related document detecting section 100 detects related information having a predetermined relationship with the target document information. For example, the related document detecting section 100 detects, as related document information, document information stored within a predetermined range from the storage position at which the target document information is stored. The predetermined range from the storage position at which the target document information is stored may be the entirety of the same directory or site as that of the target document information. Preferably, the related document detecting section 100 detects plural pieces of related document information. The related document detecting section 100 sequentially transmits the target document information and the related document information to the component converting section 105.

On receiving the document information from the related document detecting section 100, the component converting section 105 converts each of the plural document components in the document information into element identifying information indicating the type or roll of the document component. The component converting section 105 then transmits the document information obtained as a result of the conversion to the component selecting section 110. The element identifying information may be the document component itself. Specifically, the component converting section 105 may convert a document component <li> indicating the start of an item into element identifying information <li> also indicating the start of the item. Preferably, the component converting section 105 stores information that associates unconverted document components with element identifying information obtained by the conversion, in a memory or the like.

On receiving a notification from the intra-document pattern of sequence converting section 130 or the inter-document pattern of sequence 160, the component converting section 105 acquires sets of new registered elements each indicating a combination of document components to be newly converted, from the memory or the like in association with element identifying information into which the set of new registered elements are to be converted. Then, the component converting section 105 converts each set of new registered elements from the document information into corresponding element identifying information.

For the document information converted by the component converting section 105 or received from the repetition end determining section 140, the component selecting section 110 selects one of the pieces of element identifying information from the document information as selected information, for example, in order of ascending frequency of occurrence. The component selecting section 110 transmits the result of the selection to the interstitial component detecting section 120. Here, the frequency of occurrence refers to, for example, the number of pieces of element identifying information in one piece of document information. Alternatively, the frequency of occurrence may refer to the number of pieces of element identifying information per the size of one piece of document information.

For each piece of selected information selected by the component selecting section 110, the interstitial component detecting section 120 detects an interstitial component arranged between the selected information and information which is arranged in the document information next to this selected information and which is of the same type as that of this selected information. Then, the interstitial component detecting section 120 transmits the interstitial component to the intra-document pattern of sequence converting section 130 for each piece of selected information. Preferably, the interstitial component detecting section 120 further detects a terminal component following plural pieces of selected information in the document information. In this case, the gap element detecting section 120 further transmits the terminal component to the intra-document pattern of sequence converting section 130.

For the document information converted by the related document detecting section 100, the intra-document pattern of sequence converting section 130 selects sets of element identifying information that appear repeatedly at a predetermined threshold frequency or higher, as candidates for a conversion source. Then, the intra-document pattern of sequence converting section 130 generates, as a candidate for a conversion destination, element identifying information indicating the pattern of sequence of the sets of element identifying information that are the candidates for the conversion source. Then, the intra-document pattern of sequence converting section 130 transmits the candidates for the conversion source and destination to the conversion instruction input section 135.

On receiving a conversion instruction from the conversion instruction input section 135, the intra-document pattern of sequence converting section 130 converts each of the sets of pieces of element identifying information that are the candidate for the conversion source, into element identifying information that is the candidate for the conversion destination. The intra-document pattern of sequence converting section 130 then transmits the result of the conversion to the repetition end determining section 140. As a specific example of detection of a set of pieces of element identifying information, the intra-document pattern of sequence converting section 130 executes the process described below. First, the intra-document pattern of sequence converting section 130 receives an interstitial component from the interstitial component detecting section 120 for each piece of selected information. Furthermore, the intra-document pattern of sequence converting section 130 receives a terminal component in association with one of the plural pieces of selected information which is arranged at the end of the document information.

Subsequently, the intra-document pattern of sequence converting section 130 detects the selected information and the interstitial component corresponding to the selected information as a set of pieces of element identifying information. If this set of pieces of element identifying information appears repeatedly at a threshold frequency or higher, the intra-document pattern of sequence converting section 130 converts the set of pieces of element identifying information. The intra-document pattern of sequence detecting section 130 also detects one of the plural pieces of selected information which is arranged at the end of the document information as well as the terminal component, as a set of pieces of element identifying information. This enables the terminal component arranged at the terminal of the document information to be also converted by the intra-document pattern of sequence converting section 130.

Preferably, the intra-document pattern of sequence converting section 130 records the unconverted set of pieces of element identifying information and the element identifying information obtained by the conversion, in the memory or the like in association with each other.

Moreover, the intra-document pattern of sequence converting section 130 registers the plural document components converted into the element identifying information indicating the pattern of sequence, in the memory or the like in association with the destined element identifying information, as a set new registered elements to be newly converted by the component converting section 105. The intra-document pattern of sequence converting section 130 then notifies the component converting section 105 of this registration. Alternatively, the intra-document pattern of sequence converting section 130 may output information as a candidate for a set of new registered components, to a user or the like in order to determine whether or not the set of new registered elements is to be registered. Then, the intra-document pattern of sequence converting section 130 may register the set of new registered elements on the basis of an input from the user.

The conversion instruction input section 135 outputs, to the user, the set of pieces of element identifying information that is a candidate for the conversion source of the intra-document pattern of sequence converting section 130 as well as the set of pieces of element identifying information that is a candidate for the conversion destination of the intra-document pattern of sequence converting section 130. The conversion instruction input section 135 thus allows the user to provide an input as to whether or not to cause the intra-document pattern of sequence converting section 130 to execute a conversion into element identifying information. The conversion instruction input section 135 then transmits a conversion instruction to the intra-document pattern of sequence converting section 130 in accordance with the input result. Alternatively, the conversion instruction input section 135 need not allow the user to provide an input as to whether or not to cause the intra-document pattern of sequence converting section 130 to execute a conversion into element identifying information. In this case, the intra-document pattern of sequence converting section 130 converts the set of document components in accordance with predetermined rules without inquiring of the user for each conversion process.

On receiving the document information from the intra-document pattern of sequence converting section 130, the repetition end determining section 140 transmits the received document information to the component selecting section 110 in order to cause the intra-document pattern of sequence converting section 130 to convert further the document information already converted by the intra-document pattern of sequence converting section 130. Furthermore, if predetermined end conditions are met, the repetition end determining section 140 transmits the document information to the inter-document pattern of sequence converting section 160 in order to end a repetition process if for example, the intra-document pattern of sequence converting section 130 has not detected any sets of element identifying information to be converted.

The inter-document pattern of sequence converting section 160 sequentially receives document information, e.g. target document information and related document information from the repetition end determining section 140. Then, for a document composed of the target document information and related document information free from the element identifying information obtained by the conversion by the intra-document pattern of sequence converting section 130, the inter-document pattern of sequence converting section 160 identifies sets of element identifying information that appear in both the target document information and the related document information. Subsequently, the inter-document pattern of sequence converting section 160 detects those of the identified sets of element identifying information which appear repeatedly at a predetermined threshold frequency or higher in the document containing a combination of the target document information and the related document information. Then, the inter-document pattern of sequence converting section 160 converts each set of pieces of element identifying information that appears repeatedly at the threshold frequency or higher into element identifying information indicating the pattern of sequence of this set of pieces of element identifying information. The inter-document pattern of sequence converting section 160 then transmits the target document information and related document information obtained as the result of the conversion to the group classifying section 170.

The inter-document pattern of sequence converting section 160 records the unconverted set of pieces of element identifying information and the set of pieces of element identifying information obtained by the conversion, in the memory or the like in association with each other. Moreover, the inter-document pattern of sequence converting section 160 registers the plural document components converted into the element identifying information indicating the pattern of sequence, in the memory or the like in association with the destined element identifying information, as a set of new registered elements to be newly converted by the component converting section 105. The inter-document pattern of sequence converting section 160 then notifies the component converting section 105 of this registration. Alternatively, the inter-document pattern of sequence converting section 160 may output information as a candidate for a set of new registered components, to the user or the like in order to determine whether or not the set of new registered elements is to be registered. Then, the inter-document pattern of sequence converting section 160 may register the set of new registered elements on the basis of an input from the user.

For each of the target document information and related document information received from the inter-document pattern of sequence converting section 160, the group classifying section 170 groups the plural document components converted into a corresponding piece of element identifying information by the intra-document pattern of sequence converting section 130. Similarly, for each piece of element identifying information obtained by the conversion by the inter-document pattern of sequence converting section 160, the group classifying section 170 groups the plural document elements converted into this piece of element identifying information. The group classifying section 170 transmits the target document information and the related document information with the result of the classification to the rearrangement output section 180, the table of contents information output section 190, the group identification information generating section 200, the annotation output section 202, and the document structure information generating section 210.

Moreover, for each group obtained by the classification, the group classifying section 170 may generate title information indicating a role played in the document information by the document components in the group or indicating the contents of the document components in the group. The group classifying section 170 may then output the title information to the table of contents information output section 190 and the annotation output section 202. More specifically, if the sets of pieces of element identifying information determined to belong to a certain group are detected using comment information as a boundary, the group classifying section 170 may generate title information to be contained in the comment information.

Alternatively, for each group obtained by the classification, the group classifying section 170 may further generate importance information indicating the importance of the group in the document information and then output this information to the rearrangement output section 180, the table of contents information output section 190, and the annotation output section 202. Specifically, the group classifying section 170 may generate importance information on the basis of arrangement information indicating where in the document information the set of pieces of element identifying information is located, information on the color of the document components converted into the set of pieces of element identifying information, information on the size of the document components, and the contents of a string that may constitute the document components.

Moreover, the group classifying section 170 may output the document components belonging to the respective groups, to the user and receive an instruction as to whether or not the document components should be classified into these groups. In this case, the group classifying section 170 determines whether or not the document components should be classified into these groups, in accordance with the instruction. Alternatively, the group classifying section 170 may output the document components belonging to the respective groups, to the user and receive a role designating instruction that designates title information to be generated in association with these groups. In this case, the group classifying section 170 may generate group information in accordance with the role designating instruction.

For the target document information, the rearrangement output section 180 rearranges the plural document components according to the groups obtained by the group classifying section 170. Alternatively, the rearrangement output section 180 may rearrange the plural groups according to their contents. For example, the rearrangement output section 180 may place groups containing letters or images before groups containing link lists, headers, footers, and advertisements by considering the former to be more important than the latter. That is, the rearrangement output section 180 may rearrange the document constituting information from the plural groups in order of its ascending importance. Then, the rearrangement output section 180 transmits target document information obtained as a result of the rearrangement, to the display section 205.

A specific example of processing, on the basis of information stored in the memory or the like by the component converting section 105, the intra-document pattern of sequence converting section 130, and the inter-document pattern of sequence converting section 160, the rearrangement output section 180 identifies the grouped document components and rearranges the document components according to these groups. The rearrangement output section 180 may further select groups with identical title information from each of the target document information and related document information on the basis of the results of classification of the related document information received from the group classifying section 170. In this case, the rearrangement output section 180 may transmit the document components belonging to these selected groups, to the display section 205.

For each group obtained by the classification by the group classifying section 170, on the basis of the received title information, the table of contents output information section 190 generates table of contents information indicating a table of contents for the document components contained in the group. The table of contents information output section 190 outputs the table of contents information to the display section 205. Furthermore, for each group obtained by the classification by the group classifying section 170, the table of contents information output section 190 may further output information indicating where in the document each document component contained in the group is located. More specifically, this information may use anchors used in a HTML document. Moreover, the table of contents information output section 190 associates and output this information indicating the position of each group, with the title of the group or the importance information on the group.

In association with each group obtained by the classification by the group classifying section 170, the group identifying information generating section 200 generates group identifying information identifying the group, in the document information. The group identifying information generating section 200 outputs the group identifying information to the display section 205. For example, the group identifying information generating section 200 may generate an image lying at a boundary between groups in the document information to specify the boundary. In response to this, the display section 205 outputs information onto the display section in accordance with the target document information and the related document information.

Furthermore, if the document information is in HTML, the group identifying information generating section 200 executes the process described below. For example, the group identifying information generating section 200 may generate output instruction information required to output group identifying information audibly, as a parameter for an alt attribute for a predetermined tag in the document information. The output instruction information is, for example, images that are difficult to identify visually on the screen, such as very small transparent images. As a result, the adverse effects on the display on a normal browser screen are minimized. On the other hand, an audio browser or the like outputs group identifying information as sounds on the basis of the contents of the image file or the like. This is convenient to aurally impaired people or the like, who use audio browsers, and is still convenient to normal people, who use normal browsers.

The annotation output section 202 generates and outputs information identifying each group obtained by the classification by the group classifying section 170, separately from the document information. For example, for each of the plural groups, the annotation output section 202 outputs, as information identifying the group, annotation information that is arrangement information indicating where in the target document information each document component belonging to this group is located. For example, the annotation output section 202 may generate and output arrangement information on the basis of a technique such as XPath or XPointer. Moreover, the annotation output section 202 may output annotation information composed of the received title information and importance information associated with the arrangement information.

Furthermore, the information processing apparatus 10 can support operations of a creator of annotation information. For example, the annotation information creator can modify or change annotation information outputted by the information processing apparatus 10 to create the desired annotation information. As a result, the annotation information creator can efficiently create the desired annotation information compared to the creation of annotation information from scratch.

For each of the target document information and related document information received from the group classifying section 170, the document structure information generating section 210 generates document structure information indicating the structure of the document information. The document structure information generating section 210 transmits the document structure information to the document information identity output section 220 in association with the received classification results. Specifically, the document information is a tagged document containing document components including display information displayed on the display screen and tag information designating the display form of the display information. The tag information is outer tag information further containing inner tag information in the display information in which the display form is designated by the tag information. In this case, in the document information converted by the component converting section 105, the document structure information generating section 210 generates document structure information in which the outer tag information constitutes a root node and in which the inner tag information constitutes leaf nodes of the root node.

The document information identity output section 220 compares each piece of document information received from the document structure information generating section 210, with the document structure information generated by the document structure information generating section 210. The document information identity output section 200 thus determines whether or not one piece of document information has a structure identical to that of another piece of document information to output the result of the determination. For example, the document information identity output section 220 may use a DOMHASH technique which predetermines a hash value for each leaf node in the document structure information and which determines whether or not the corresponding hash values differ from each other. Moreover, the document information identify output section 220 may use classification information to determine the identity.

Thus, the information processing apparatus 10 groups the plural document components contained in the document information. Moreover, the information processing apparatus 10 can rearrange the document components according to the groups to execute processes such as the creation of a table of contents.

Figure 2:
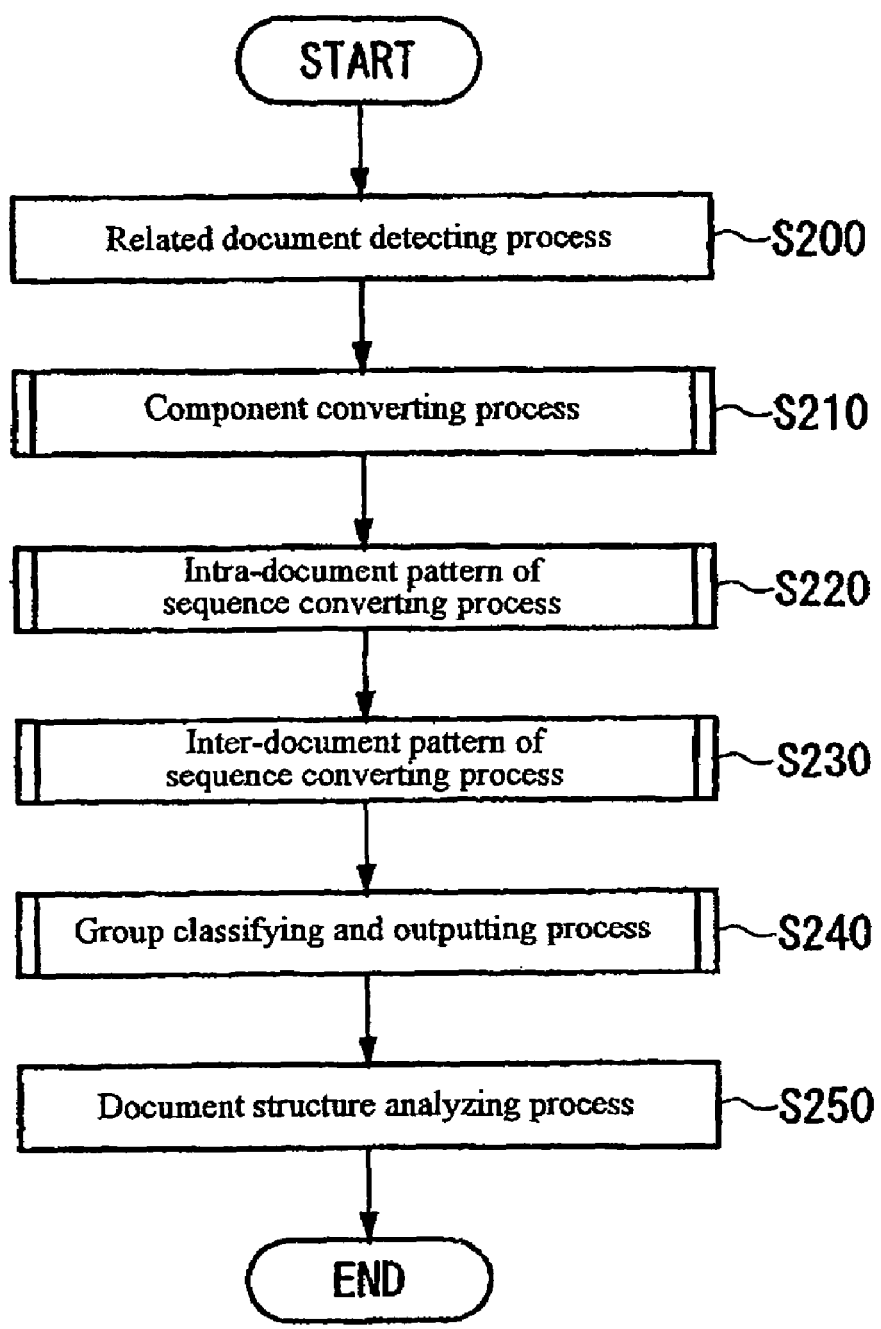
FIG. 2 is a flow chart of the information processing apparatus 10.

FIG. 2 is a flow chart for the information processing apparatus 10. On acquiring target document information to be grouped, the related document detecting section 100 detects related document information having a predetermined relationship with the target document information (S200). For example, the related document detecting section 100 detects, as related document information, document information stored in a predetermined range from a storage position where the target document information is stored.

Alternatively, if the target document information is generated by updating existing document information present before the target document information is generated, the related document detecting section 100 may detect this existing document information as related document information. More specifically, the related document detecting section 100 may detect document having a file name, path name, or URL identical to that of the target document information, as related document information.

Alternatively, the related document detecting section 100 may detect, as related document information, both the document information stored in the predetermined range from the storage position where the target document information is stored and the existing document information present before the target document information is generated.

The component converting section 105 converts each of the plural document components in the document information (for example, the target document information or the related document information) into element identifying information indicating the type or role of the document component (S210). Then, for the converted document information, the intra-document pattern of sequence converting section 130 converts each set of pieces of element identifying information that appears repeatedly at a predetermined threshold frequency or higher, into element identifying information indicating the pattern of sequence of the set of pieces of element identifying information (S220).

For a document composed of the target document information and related document information free from the element identifying information obtained by the conversion by the intra-document pattern of sequence converting section 130, the inter-document pattern of sequence converting section 160 identifies sets of element identifying information that appear in both the target document information and the related document information (S230). Subsequently, the inter-document pattern of sequence converting section 160 detects those of the identified sets of element identifying information which appear repeatedly at a predetermined threshold frequency or higher in the document containing a combination of the target document information and the related document information. Then, the inter-document pattern of sequence converting section 160 converts each set of pieces of element identifying information that appears repeatedly at the threshold frequency or higher into element identifying information indicating the pattern of sequence of this set of pieces of element identifying information.

For each of the target document information and related document information received from the inter-document pattern of sequence converting section 160, the group classifying section 170 groups the plural document components converted into a corresponding piece of element identifying information by the intra-document pattern of sequence converting section 130 (S240). Similarly, for each piece of element identifying information obtained by the conversion by the inter-document pattern of sequence converting section 160, the group classifying section 170 groups the plural document elements converted into this piece of element identifying information.

For each of the target document information and related document information received from the inter-document pattern of sequence converting section 160, the document structure information generating section 210 generates document structure information indicating the structure of the document information (S250). Then, the document information identity output section 220 determines whether or not the target document information and related document information have an identical structure, in comparison with the document structure information generated by the document structure information generating section 210. The document information identity output section 200 then outputs the results of the determination.

The above process executed by the document structure information generating section 210 and the document information identity output section 220 is not an essential arrangement of the present embodiment. That is, the document structure information generating section 210 need not generate document structure information. The document information identity output section 220 need not output the results of determinations for identity.

Furthermore, the information processing apparatus 10 need not execute one of steps S220 and S230. That is, the intra-document pattern of sequence converting section 130 need not convert each set of pieces of element identifying information that appears repeatedly at a predetermined threshold frequency or higher, into element identifying information indicating the pattern of sequence of the set of pieces of element identifying information. Furthermore, for a document composed of the target document information and related document information free from the element identifying information obtained by the conversion by the intra-document pattern of sequence converting section 130, the inter-document pattern of sequence converting section 160 need not identify sets of element identifying information that appear in both the target document information and the related document information.

Figure 3:
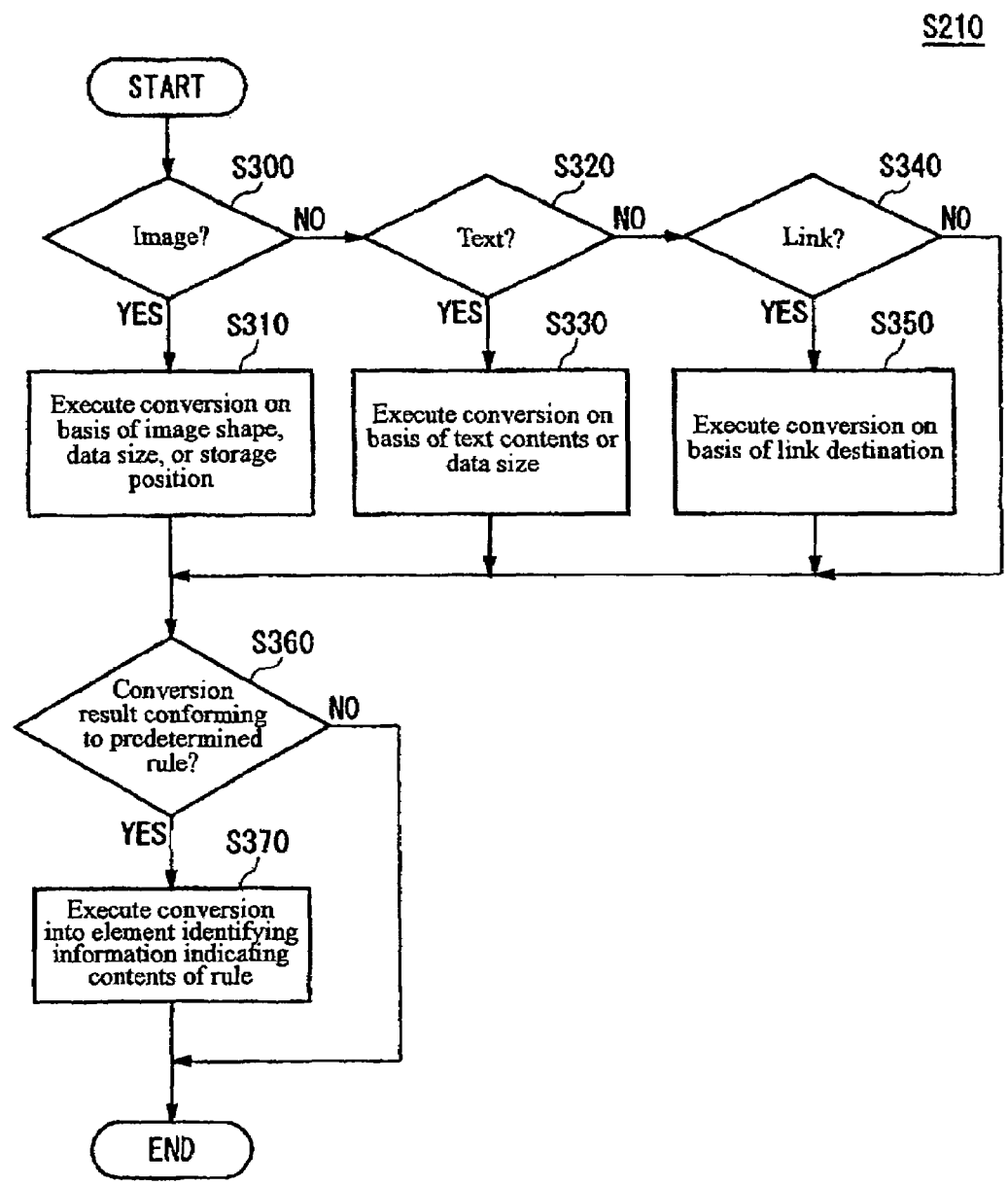
FIG. 3 is a flow chart of step S210 in FIG. 2.

FIG. 3 is a flow chart of step S210 in FIG. 2. The component converting section 105 repeatedly executes the process below on each document component in the document information. The document information has as a document component image identification information identifying images displayed on the display screen. If any document component is such image identifying information (S300: YES), the component converting section 105 converts this image identifying information into element type information indicating the shape, data size, or storage position of an image identified by the image identifying information (S310).

For example, if the ratio of the vertical to horizontal length of the image identified by the image identifying information is larger than a predetermined value, the component converting section 105 may convert the image identifying information into element identifying information <divider/> indicating a divider image for sentences or the like. Alternatively, the component converting section 105 may convert, into <divider/>, image identifying information identifying an image which is transparent or monochrome and smaller than a predetermined size and which is arranged in an area having a ratio of vertical to horizontal length larger than a predetermined value.

If the document component is not image identifying information (S300: NO), the component converting section 105 determines whether or not the document component is text data (S320). If the document component is text data (S320: YES), the component converting section 105 converts the text data into element type information indicating the contents or data size of the text data (S330).

If the document component is not text data (S320: NO), the component converting section 105 determines whether or not the document component is link information used to display different information in response to a user's instruction (S340). If the document component is link information (S340: YES), the component converting section 105 converts the document component into element identifying information based on a link destination in the link information (S350).

After applying the above process to each document component, the component converting section 105 executes the process below. The component converting section 105 determines whether or not the document component conforms to a predetermined rule (S360). For example, to detect link list information indicating indexes in the document, the component converting section 105 stores in advance the pattern of sequence of the document components forming the link list information. Then, the component converting section 105 determines whether or not the arrangement of the document components conforms to this pattern of sequence.

For the converted document information, if the element identifying information conforms to the predetermined rule (S360: YES), the component converting section 105 converts the document component into element identifying information indicating the contents of the rule (S370). For example, the component converting section 105 converts a set of document components forming the link list into element identifying information indicating that this document component is a link list. In another example, the component converting section 105 converts a set of document components forming a scoreboard for a sport such as baseball, into element identifying information indicating a scoreboard. If the link information is for a predetermined advertisement site and an image is used as display information instructed to display information on a link destination, the component converting section 105 converts the link information and the image into <ad/>, element identifying information indicating an advertisement.

Alternatively, the component converting section 105 may convert different document components into the same element identifying information. For example, the component converting section 105 may convert the document component <img src="arrow.gif"> indicating an image having a predetermined size or smaller and the point "•", indicating the start point of an item or the like, into the same element identifying information <bullet/>. In this manner, if different document components are of the same type, the component converting section 105 converts these document components into element identifying information identifying this type.

Alternatively, the component converting section 105 may convert identical document components into different pieces of element identifying information. For example, the component converting section 105 converts the document component "•Today's News" indicating items into the different pieces of element identifying information <bullet/> and <shorttext/>. On the other hand, the component converting section 105 converts the document component "You are going to have a math and science tests today" into the element identifying information <shorttext/>. That is, the component converting section 105 converts even the identical document component, in this case, the point "•", into different pieces of element identifying information in accordance with the role of this document component.

Furthermore, on receiving a notification from the intra-document pattern of sequence converting section 130 or the inter-document pattern of sequence converting section 160, the component converting section 105 acquires sets of new registered elements from the memory or the like in association with element identifying information into which the sets of new registered elements is to be converted. Then, the component converting section 105 converts each set of new registered elements in the document information into the corresponding element identifying information. Specifically, for previously converted sets of document components, the information processing apparatus 10 causes the component converting section 105 to execute converting processes in place of the intra-document pattern of sequence converting section 130 or the inter-document pattern of sequence converting section 160. This enables the information processing apparatus 10 to execute converting processes more efficiently.

Thus, the component converting section 105 converts each of the plural document components in the document information into element identifying information indicating the type or role of the document component. The component converting section 105 also converts a set of pieces of element identifying information which meets a predetermined condition, into element identifying information indicating the contents of the condition. As a result, the information processing apparatus 10 can determine, for example, whether a set of document components is arranged so as to be displayed to the user in a table form or utilizes the table form to improve the layout of the document information. Moreover, the information processing apparatus 10 can identify the roles of some sets of document components, for example, indicate that each set of document components is a scoreboard or an advertisement.

Furthermore, the procedure of the process executed by the component converting section 105 is not limited to the example shown in the figures. For example, if the predetermined rule in S360 relates to document components instead of element identifying information, the component converting section 105 may determine conformity with the predetermined rule (S360) before converting an image, a test, and a link (S310, S330, and S350, respectively).

Figure 4:
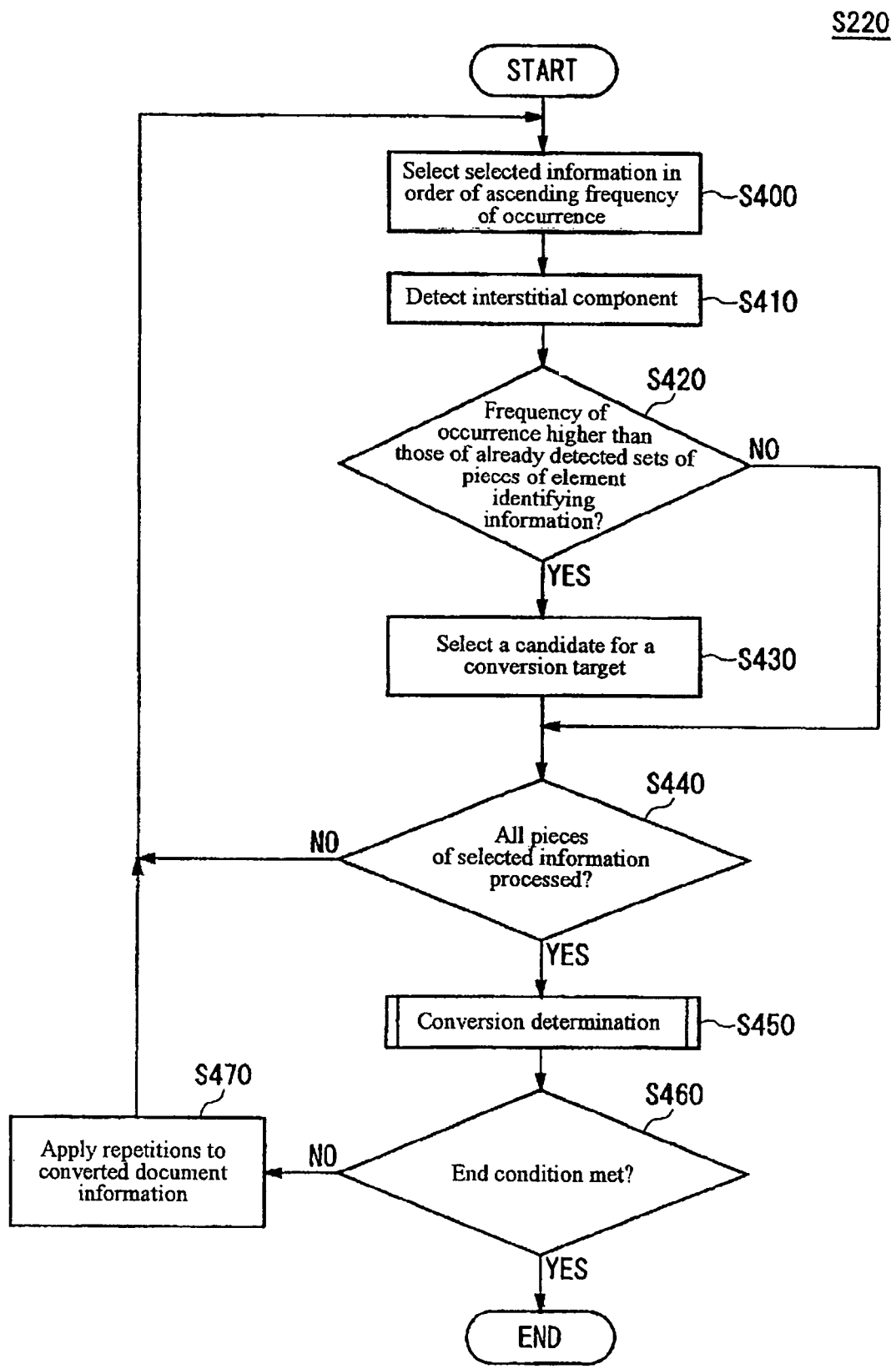
FIG. 4 is a flow chart of step S220 in FIG. 2.

FIG. 4 is a flow chart of step S220 in FIG. 2. For each piece of document information converted by the component converting section 105, the component selecting section 110 selects one of the pieces of element identifying information in the document information as selected information in order of ascending frequency of occurrence (S400). The interstitial component detecting section 120 detects an interstitial component arranged between the selected information selected by the component selecting section 110 and information which is arranged in the document information next to this selected information and which is of the same type as that of this selected information (S410).

Here, the interstitial component does not contain element identifying information of the same type as that of the selected information. Specifically, the interstitial component detecting section 120 sequentially detects the element identifying information arranged next to the selected information and determines element identifying information detected before the detection of element identifying information of the same type as that of the selected information, to be an interstitial component.

Thus, the intra-document pattern of sequence converting section 130 detects selected information and an interstitial component as a set of pieces of element identifying information. If the target document information contains comment information arranged in the target document but not displayed on the display screen, the intra-document pattern of sequence converting section 130 may use this comment information as information indicating the boundary between one set of pieces of element identifying information and another set of pieces of element identifying information. For example, if the target document information contains <!-START AA> and <!-END AA> as comment information, the intra-document pattern of sequence converting section 130 may detect the information arranged between these pieces of comment information as a set of pieces of element identifying information. The group classifing section 170 may specify functions implemented by groups based on information contained in the comment information such as a character string in "AA" portion. If the comment information does not contain a predetermined character string such as "START", the intra-document pattern of sequence converting section 130 need not use the comment information as the boundary between sets of pieces of element identifying information.

In yet another example, the intra-document pattern of sequence converting section 130 may use a document component indicating a space of a predetermined size or larger or a new line, as information indicating the boundary between one set of pieces of element identifying information and another set of pieces of element identifying information.

It is assumed that the set of the selected information selected by the component selecting section 110 and the interstitial component detected by the interstitial component detecting section 120 has a higher frequency of occurrence than a set of pieces of element identifying information already detected by the component selecting section 110 and the interstitial component detecting section 120 (S420: YES). Then, the intra-document pattern of sequence converting section 130 selects the set of the selected information selected by the component selecting section 110 and the interstitial component detected by the interstitial component detecting section 120, as a candidate for a conversion target (S430). On the other hand, if it has a lower frequency of occurrence than the already detected set of pieces of element identifying information (S420: NO), the information processing apparatus 10 shifts the process to step S440.

The interstitial component detected by the interstitial component detecting section 120 may be an empty set not containing any document components or element identifying information. In this case, if plural pieces of selected information of the same type are consecutively arranged, the intra-document pattern of sequence converting section 130 selects these pieces of selected information as a candidate for a conversion target.

If a certain piece of element identifying information in the document information has not been selected as selected information (S440: NO), the component selecting section 110 returns the process to step S400 to select a piece of element identifying information with the next highest frequency of occurrence as selected information. On the other hand, if all the pieces of element identifying information in the document information have been selected as selected information (S440: YES), the component selecting section 110 converts the set of pieces of element identifying information selected as a candidate for a conversion target at step S430, into element identifying information indicating the pattern of sequence of the set of pieces of element identifying information on the basis of a predetermined determination (S450).

If a predetermined end condition has not been met (S460: NO), the repetition end determining section 140 returns the process to step S400 to convert further the converted document information (S470). Then, it is assumed that for the set of pieces of element identifying information to be converted by the intra-document pattern of sequence converting section 130, the total size of the document components converted into the element identifying information meets the predetermined condition, e.g. the size of information that can be displayed on one screen at a time has been reached. Then, the repetition end determining section 140 excludes the set of pieces of element identifying information from targets repeatedly converted by intra-document pattern of sequence converting section 130 during the subsequent process. For example, the repetition end determining section 140 may convert the set of pieces of element identifying information into predetermined element identifying information indicating that the subsequent conversions will be stopped. This enables the total size of the document components in each group to be maintained at a predetermined value or smaller. Therefore, each group can be displayed within the display screen.

If the total size of the document components has reached the size of information that can be displayed on one screen at a time, the repetition end determining section 140 may exclude the set of pieces of element identifying information from the targets repeatedly converted by intra-document pattern of sequence converting section 130 during the subsequent process. Specifically, the size of information that can be displayed on the display screen may be such that the amount of scrolling on the display screen carried out by the user to browse information has a predetermined value or smaller.

On the other hand, if the predetermined end condition has been met (S460: YES), the repetition end determining means 140 ends the process. For example, if none of the candidates to be converted have been converted at step S450, the repetition end determining means 140 may determine that the predetermined end condition has been met.

Figure 5:
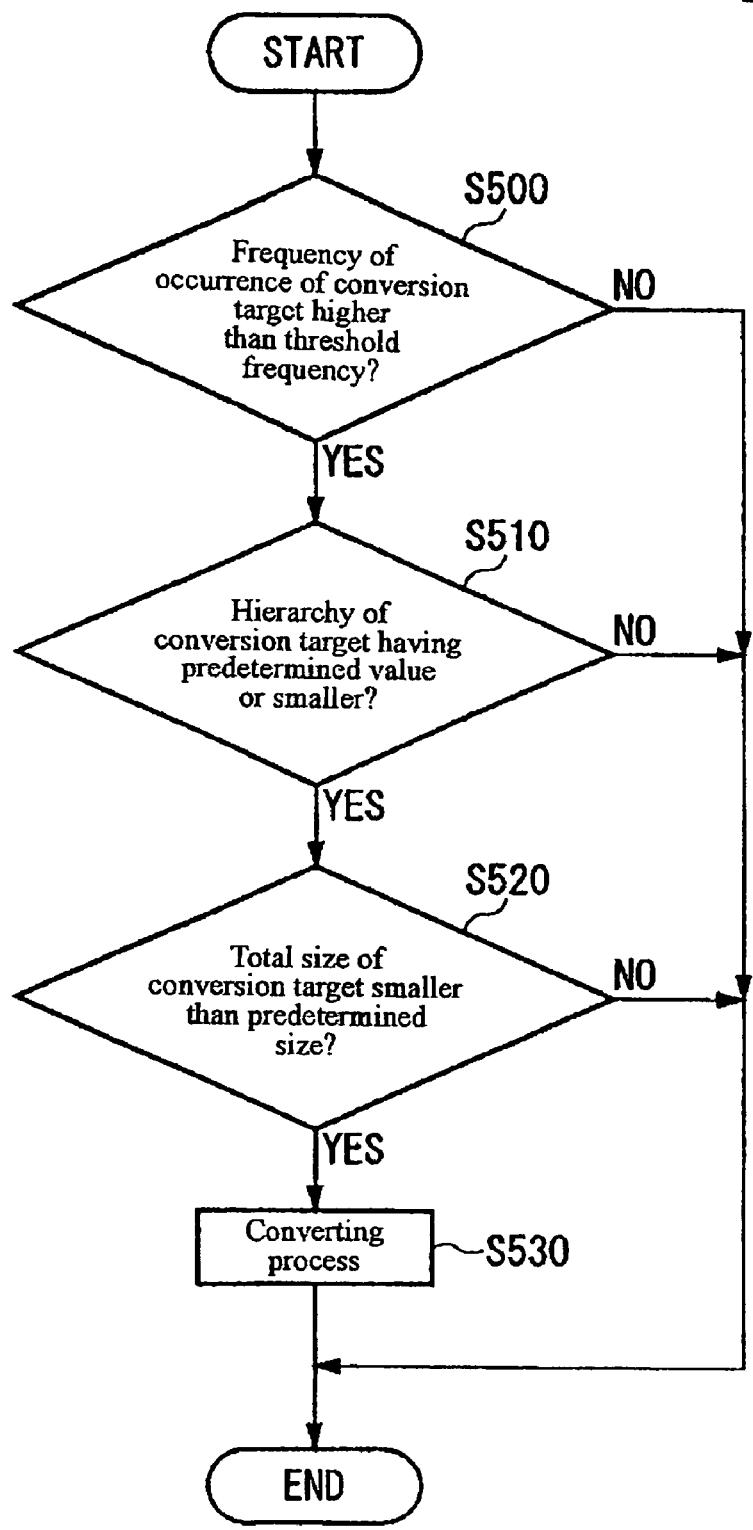
FIG. 5 is a flow chart of step S450 in FIG. 4.

FIG. 5 is a flow chart of step S450 in FIG. 4. The intra-document pattern of sequence converting section 130 executes the process described below, on each set of pieces of element identifying information as a candidate for a conversion target. If the set of pieces of element identifying information as a candidate for a conversion target has not appeared in the 5 document information at a threshold frequency or higher (S500: NO), the intra-document pattern of sequence converting section 130 ends the process of excluding the set of pieces of element identifying information from the conversion targets.

On the other hand, if the set of pieces of element identifying information as a candidate for a conversion target has appeared in the document information at the threshold frequency or higher (S500: YES), the intra-document pattern of sequence converting section 130 determines whether or not the conversion hierarchy of the set of pieces of element identifying information as a candidate for a conversion target has a predetermined value or smaller (S510). In this case, the conversion hierarchy of the set of pieces of element identifying information refers to, for example, the number of repeated conversions executed on the document information by the intra-document pattern of sequence converting section 130 to convert the unconverted document components into the set of pieces of element identifying information.

If the conversion hierarchy of the set of pieces of element identifying information as a candidate for a conversion target exceeds the predetermined value (S510: NO), then the intra-document pattern of sequence converting section 130 ends the process of excluding the set of pieces of element identifying information from the conversion targets. On the other hand, if the conversion hierarchy of the set of pieces of element identifying information as a candidate for a conversion target has the predetermined value or smaller (S510: YES), then the intra-document pattern of sequence converting section 130 determines whether or not the total size of the document components converted into the set of pieces of element identifying information as a candidate for a conversion target is smaller than a predetermined reference size (S520).

If the total size of the document components converted into the set of pieces of element identifying information is equal to or larger than the predetermined reference size (S520: NO), the intra-document pattern of sequence converting section 130 ends the process of excluding the set of pieces of element identifying information from the conversion targets. On the other hand, if the total size of the document components converted into the set of pieces of element identifying information is smaller than the predetermined reference size (S520: YES), the intra-document pattern of sequence converting section 130 determines the set of pieces of element identifying information as a candidate for a conversion target, to be a conversion target.

Specifically, the intra-document pattern of sequence converting section 130 converts each set of element identifying information appearing in the document information, into element identifying information indicating the pattern of sequence of the set of pieces of element identifying information (S530).

It is assumed that sets of pieces of element identifying information appear repeatedly at the threshold frequency or higher and that the total size of the document components converted into the set of pieces of element identifying information is smaller than the predetermined reference size. Then, the intra-document pattern of sequence converting section 130 converts each of these sets of pieces of element identifying information into element identifying information indicating the pattern of sequence of the set of pieces of element identifying information. This prevents the size of the document components in the group from becoming excessive. For example, even if the information processing apparatus 10 is a portable information processing apparatus such as a PDA which has a display screen of a limited size, it can group the document information so that each group can be displayed within the display screen.

Furthermore, it is assumed that a set of pieces of element identifying information appears repeatedly at the threshold frequency or higher and that the intra-document pattern of sequence converting section 130 executes a reference number of or less repeated conversions on the document information to convert the unconverted document components into the set of pieces of element identifying information. Then, the intra-document pattern of sequence converting section 130 converts this set of pieces of element identifying information into element identifying information indicating a pattern of sequence. This prevents the size of the document components in the group from becoming excessive. If for example, the conversion layers of the target groups are already identified, the intra-document pattern of sequence converting section 130 can appropriately convert the set of pieces of element identifying information.

The order of the processes shown in the present figure is only an example. The information processing apparatus 10 may make determinations in a different order. Furthermore, the information processing apparatus 10 may omit at least some of the determinations shown in the present figure.

For example, even if the total size of the document components converted into the set of pieces of element identifying information is smaller than the predetermined reference size (S520: NO), the intra-document pattern of sequence converting section 130 may convert this set of pieces of element identifying information. In this case, the entire document information is set as one group. This may accomplish more precise and flexible grouping. An example will be shown below.

The information processing apparatus 10 outputs information indicating the progress of conversions by the intra-document pattern of sequence converting section 130, to the user. For example, for each converting process, the information processing apparatus 10 associates a set of pieces of element identifying information as a conversion source with element identifying information as a conversion destination. The information processing apparatus 10 then outputs the result of the association in the form of a hierarchical structure as information indicating the progress of the conversion. The user selects element identifying information from the hierarchical structure which is desired to be actually divided into groups.

Thus, although the user must provide an input, grouping can be accomplished more properly and flexibly than in the case in which the groups are determined using a reference size. In some cases, even if title information on a group of the reference size or smaller cannot be identified, if title information on a group of the reference size or larger can be identified, then the latter title information can be utilized to identify the group of the reference size or smaller. This makes the grouping more accurate.

Alternatively, the information processing apparatus 10 may add further determinations to those shown in the present figure. For example, the intra-document pattern of sequence converting section 130 may define a pattern of sequence not to be detected as a set of pieces of element identifying information, on the basis of the user's input or the like. That is, the intra-document pattern of sequence converting section 130 excludes a set of pieces of element identifying information matching this pattern of sequence, from the conversion targets.

The pattern of sequence not to be detected as a set of pieces of element identifying information may contain, for example, an image having a predetermined shape and used as a partition for a display area or a space having a predetermined area or larger. Alternatively, the intra-document pattern of sequence converting section 130 may inquire, for each classifying process, of the user as to whether the pattern of sequence is to be detected as a set of pieces of element identifying information or allow the user to input related information beforehand.

Alternatively, the intra-document pattern of sequence converting section 130 may use a different method to detect a set of pieces of element identifying information into element identifying information indicating the pattern of sequence of the set of pieces of element identifying information. That is, the method used by the intra-document pattern of sequence converting section 130 to detect a set of pieces of element identifying information has only to detect a set of pieces of element identifying information which appears at the threshold frequency or higher.

Figure 6:
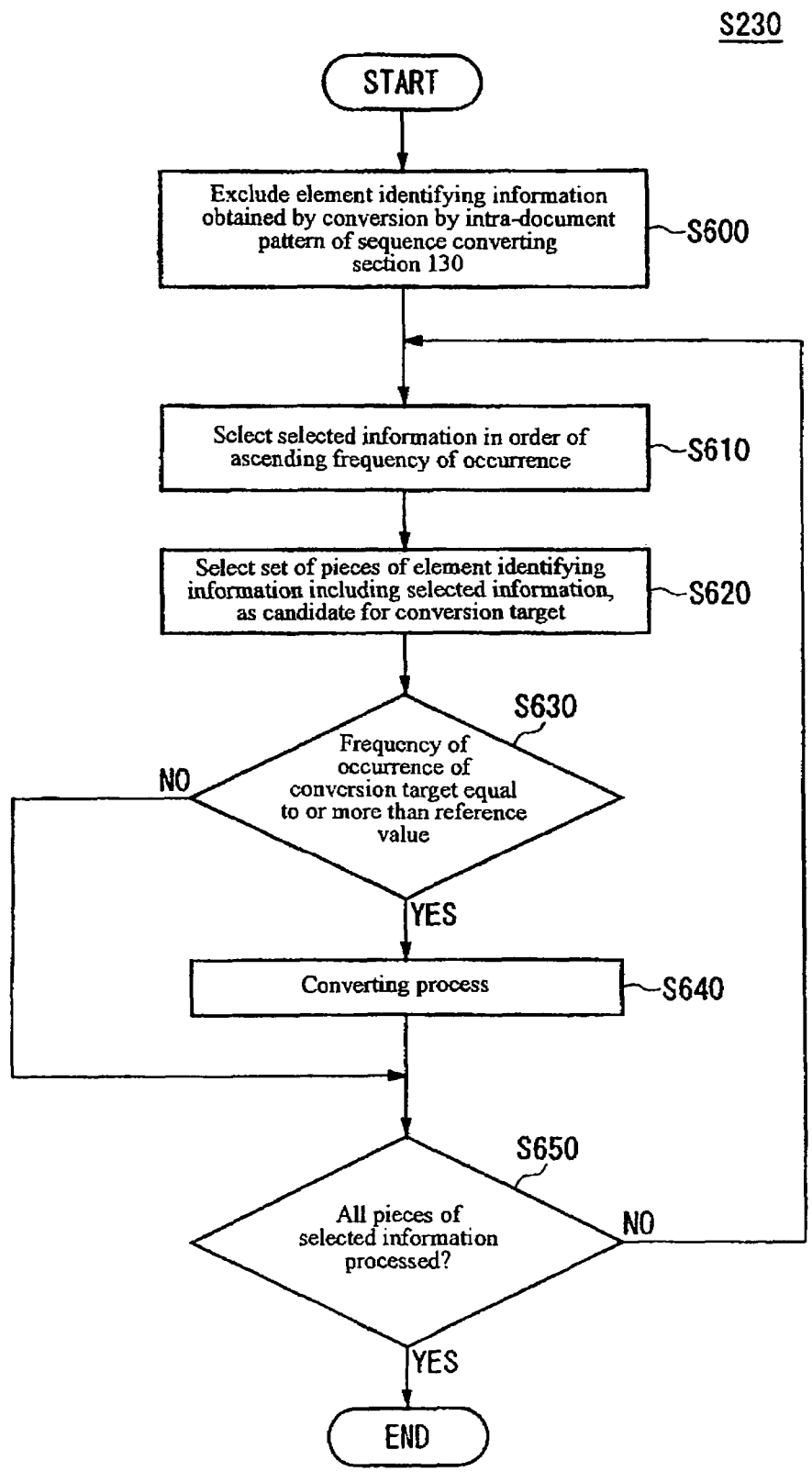
FIG. 6 is a flow chart of step S230 in FIG. 2.

FIG. 6 shows a flow chart of step S230 in FIG. 2. The inter-document pattern of sequence converting section 160 sets, as a detection target, the target document information and related document information free from the element identifying information obtained by the conversion by the intra-document pattern of sequence converting section 130 (S600).

More specifically, the inter-document pattern of sequence converting section 160 may convert the element identifying information obtained by the conversion by the intra-document pattern of sequence converting section 130, into the element identifying information <group/> indicating that the element identifying information has been obtained by the conversion by the intra-document pattern of sequence converting section 130. Thus, during the subsequent process, the inter-document pattern of sequence converting section 160 can appropriately detect and exclude the element identifying information obtained by the conversion by the intra-document pattern of sequence converting section 130.

Subsequently, for a document containing a combination of the target document information and related document information in the identified set of pieces of element identifying information, the inter-document pattern of sequence converting section 160 sequentially selects the element identifying information as selected information in order of ascending frequency of occurrence (S610). Then, the inter-document pattern of sequence converting section 160 inserts information indicating the boundary between the target document information and the related document information, into the document containing the combination of the target document information and the related document information. Then, the inter-document pattern of sequence converting section 160 selects the set of pieces of element identifying information containing the selected information, as a candidate for a conversion target (S620).

Specifically, the inter-document pattern of sequence converting section 160 selects the selected information and the interstitial component as a set of pieces of element identifying information. In this case, the inter-document pattern of sequence converting section 160 may use <group/>, indicating that intra-document pattern of sequence converting section 130 has already executed a conversion into element identifying information, as the boundary between one set of pieces of element identifying information and another set of pieces of element identifying information. Alternatively, the inter-document pattern of sequence converting section 160 may use information indicating the boundary between the target document information and the related document information as information indicating the boundary between one set of pieces of element identifying information and another set of pieces of element identifying information.

If the set of pieces of element identifying information as a candidate for a conversion target appears repeatedly at a predetermined frequency or higher (S630: YES), the inter-document pattern of sequence converting section 160 converts the set of pieces of element identifying information into element identifying information indicating the pattern of sequence of the set of pieces of element identifying information (S640). Subsequently, if in the document containing the combination of the target document information and the related document information, a certain piece of element identifying information has not been selected as selected information (S650: NO), the inter-document pattern of sequence converting section 160 returns the process to step S610 to select a piece of element identifying information with the next highest frequency of occurrence as selected information. If in the document containing the combination of the target document information and the related document information, all the pieces of element identifying information have been selected as selected information (650: YES), the inter-document pattern of sequence converting section 160 ends the process.

The threshold frequency used by the inter-document pattern of sequence converting section 160 may differ from the threshold frequency used by the intra-document pattern of sequence converting section 130. Specifically, it is assumed that a set of pieces of element identifying information as a candidate for a conversion target appears at a second frequency or higher which is different from a first frequency that is a threshold frequency used for determinations by the intra-document pattern of sequence converting section 130. Then, the inter-document pattern of sequence converting section 160 may convert this set of pieces of element identifying information into element identifying information indicating the pattern of sequence of this set of pieces of element identifying information.

Figure 7:
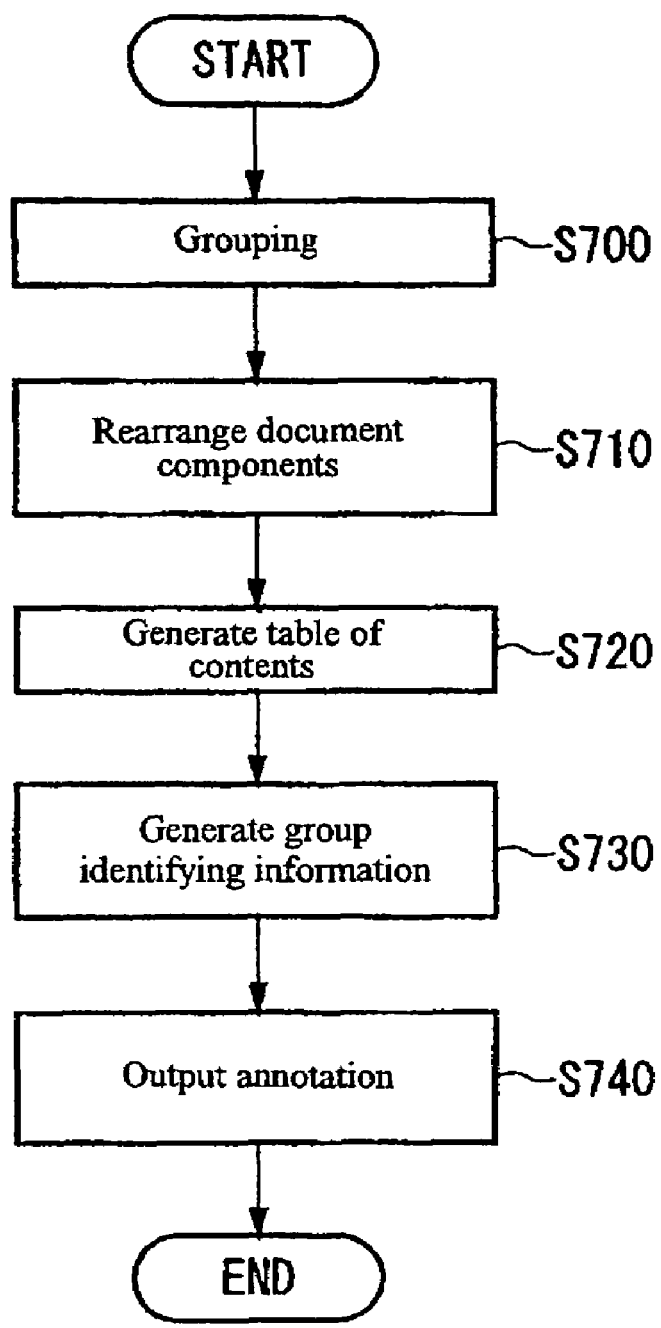
FIG. 7 is a flow chart of step S240 in FIG. 2.

FIG. 7 is a flow chart of step S240 in FIG. 2. For the document information obtained by allowing the intra-document pattern of sequence converting section 130 to convert the target document information repeatedly, the group classifying section 170 groups the plural document components converted into a corresponding piece of element identifying information by the intra-document pattern of sequence converting section 130 (S700). Likewise, the group classifying section 170 groups the plural document components converted into a corresponding piece of element identifying information by the inter-document pattern of sequence converting section 160.

Alternatively, for each group obtained, the group classifying section 170 may generate title information indicating a role played in the document information by the document components in the group. The group classifing section 170 may then output the title information to the table of contents information output section 190, the group identifying information generating section 200, and the annotation output section 202. More specifically, if the sets of pieces of element identifying information determined to belong to a certain group are detected using comment information as a boundary, the group classifying section 170 may generate title information to be contained in the comment information. Furthermore, for each group obtained, the group classifing section 170 may further generate importance information indicating the importance of the group in the document information. The group classifying section 170 may then output the importance information to the rearrangement output section 180, the group identifying information generating section 200, and the annotation output section 202. Specifically, the group classifying section 170 may generate importance information on the basis of arrangement information indicating where in the document information the set of pieces of element identifying information is located, information on the color of the document components converted into the set of pieces of element identifying information, information on the size of the document components, and the contents of a character string that may constitute the document components.

Moreover, the group classifying section 170 labels the document information free from the successfully grouped document components, i.e. a part of the document information that cannot have been grouped, as a group indicating that the document components belonging to this group cannot have been grouped. In this case, the group classifying section 170 may further divide the part of the document information that cannot have been grouped into plural groups according to a position in the document information, a position on the display screen, and a background color on the display screen.

For each of the target document information and related document information, the rearrangement output section 180 rearranges the plural document components according to the groups obtained by the classification by the group classifying section 170 (S710). Then, for each group obtained by the classification by the group classifying section 170, the table of contents information output section 190 generates table of contents information indicating a table of contents for the document components contained in the group (S720). Moreover, in association with each group obtained by the classification by the group classifying section 170, the group identifying information generating section 200 generates information in the document information which facilitates the auditory identification of the group (S730).

The annotation output section 202 outputs annotation information identifying each group obtained by the classification by the group classifying section 170 (S740). For example, for each of the plural groups, the annotation output section 202 outputs, as annotation information, arrangement information where in the target document information, document structure information belonging to this group is located. For example, the annotation output section 202 may generate and output arrangement information on the basis of a technique such as XPath or XPointer.

Thus, other apparatuses to which annotation information is inputted cannot only rearrange information in the target document information, create a table of contents, or output group identifying information but also execute other processes using the transcoding technique, such as creation of a digest of the target document information.

Furthermore, the information processing apparatus 10 can support operations performed by an annotation information creator. For example, the annotation information creator can create desired annotation information by modifying or changing annotation information outputted by the information processing apparatus 10. As a result, the annotation information creator can create the desired annotation information more efficiently than in the case where the creator creates annotation information from the beginning.

FIG. 8 shows an example in which the component converting section 105 converts document components into element identifying information. As shown in the present figure, the component converting section 105 converts each document component into element identifying information indicating the contents, data size, storage position, or the like of the document component. Specifically, if the document component is a numerical value, the component converting section 105 converts the document component into the element identifying information <digit A>, indicating a numerical value. Preferably, the component converting section 105 generates tag information in a form conforming to the XML (extensible Markup Language) standard, as element identifying information for a conversion destination. This enables an existing program operating XML documents.

Furthermore, if the document component is a character string containing 100 letters or more, the component converting section 105 converts the document component into the element identifying information <longtext/>, indicating a long character string. Similarly, the component converting section 105 converts a string containing 30 to 100 letters, 2 to 30 letters, or 1 letter into the element identifying information <midtext >, <shorttext/>, or <letter/>, respectively.

Alternatively, the component converting section 105 may generate element identifying information containing tag information indicating a string, and an attribute indicating the length of the string and associated with the tag information. For example, the component converting section 105 may generate the element identifying information <text length="long" is_digit="no">, indicating a character string which is longer than a predetermined length and which is not composed of numerical values. Moreover, the component converting section 105 may generate, as element identifying information, tag information and an attribute composed of information indicating the length of a character string.

Thus, the component converting section 105 converts a document component constituting a character string into element identifying information that depends on whether or not the string is composed of numbers. Moreover, the component converting section 105 may convert a document component constituting a character string into element identifying information that depends on words contained in the string.

Furthermore, the component converting section 105 converts image identifying information into the element identifying information <in-largeimg/>, the image identifying information identifying an image which is displayed on the display screen, which is present in the same site as that of the target document information, and which has a size of 300' 300 pixels or larger. For example, if the target document information is an HTML document, the image identifying information is image tag information such as <img src="AAA.JPG">. The component converting section 105 may render and/or analyze an image to be displayed in order to determine the display size of the image. More specifically, the component converting section 105 may analyze size information recorded in a header portion of an image file.

Moreover, the component converting section 105 may analyze information such as the position of an image on the display screen and the color of the image by rendering or the like. In this case, the component converting section 105 may convert the image identifying information into element identifying information indicating the position of an image on the display screen, the color of the image, or the like.

Similarly, the component converting section 105 converts image identifying information into the element identifying information <in-midimg/>, the image identifying information in which an image is present in the same site as that of the target document information and which has a size of 100' 100 to 300' 300 pixels or larger. Furthermore, the component converting section 105 converts image identifying information into the element identifying information <in-smallimg/>, the image identifying information in which an image is present in the same site as that of the target document information and which has a size of 100' 100 pixels or smaller. Similarly, the component converting section 105 converts image identifying information identifying an image which is present in the different site as that of the target document information, into <out-largeimg/>, <out-midimg>, or <out-smallimg/> depending on the size of the image.

Alternatively, the component converting section 105 may generate element identifying information containing tag information representing an image and an attribute indicating the size of the image and associated with the tag information. For example, instead of <in-largeimg/>, the component converting section 105 may generate the element identifying information <image size="large" location="in"/>, having a data size within a predetermined range and indicating an image present in the same site.

Thus, the component converting section 105 converts each document component in the document information into element identifying information that depends on the data size of the document component. Preferably, the component converting section 105 converts each document component into different types of element identifying information depending on the type of the string or image. For example, even with the same number of letters in the string, the component converting section 105 may convert the document component into different types of element identifying information depending on the percentages of the total length of the string taken up by numbers, Chinese characters, hiragana, katakana, and alphabets. Alternatively, even with the same data size of the image, the component converting section 105 may convert the document component into different types of element identifying information depending on whether the image is elongate in the vertical or horizontal direction or on the data format of the image.

The document information contains as the document components display information displayed to the user and storage position information indicating the storage position of different information to be displayed in accordance with the user's instruction for the display information. For example, if the document information is an HTML document, the display information and the storage position information are hyperlinks causing other information to be displayed in response to the user's instruction. For example, the storage position information is tag information such as <a href="BBB.HTML"> and tag information such as </a>. The display information is information arranged between the tag <a> and the tag </a>.

The component converting section 105 converts the storage position information into element identifying information indicating the range of storage positions indicated by the storage position information. For example, if different information at a link destination is stored in the same directory as that of the target document information, the component converting section 105 converts the storage position information indicating the storage position of the different information, into the element identifying information <samedir-link> and </samedir-link>, indicating the range of storage positions. More specifically, the component converting section 105 converts, for example, the tag information <a href="BBB.HTML">, which is storage position information and which indicates the start point of display information, into <samedir-link>. Furthermore, the component converting section 105 converts </a>, indicating the end point of the display information, into </samedir-link>.

Alternatively, the component converting section 105 may generate element identifying information composed of tag information representing a link and an attribute indicating a link destination of the link. For example, the component converting section 105 may generate <link location="same" target-"none"/> instead of <samedir-link> and </samedir-link>.

Furthermore, the component converting section 105 need not convert the display information arranged between <a href="BBB.HTML"> and </a>. Alternatively, the component converting section 105 may convert this display information into element identifying information indicating another type.

If different information at the link destination is stored in the same site of that of the target document information, the component converting section 105 converts storage position information indicating the storage position of the different information into the element identifying information <in-link> and </in-link>, indicating the range of storage positions.

On the other hand, if the different information at the link destination is stored in a site different from that of the target document information, the component converting section 105 converts storage position information indicating the storage position of the different information into the element identifying information <out-link> and </out-link>, indicating the range of storage positions.

Thus, the component converting section 105 may detect the type or role of each document component on the basis of the parameter for the attribute in the tag information. Then, the component converting section 105 converts the document component into element identifying information indicating the type or the like of the parameter for the document component.

Thus, the component converting section 105 converts each of the plural document components in the document information into element identifying information indicating the type or role of the document component.

FIG. 9 shows an example in which the component converting section 105 converts a predetermined set of pieces of element identifying information into different element identifying information. Following the conversion shown in FIG. 8, the component converting section 105 converts a set of pieces of element identifying information conforming to predetermined conditions, into different element identifying information. For example, the present figure shows an example in which the component converting section 105 detects a set of document components forming a scoreboard in a sport such as baseball and converts this set into element identifying information indicating a scoreboard, e.g. <baseball-scoreboard/>.

The component converting section 105 constructs a table composed of at least 3 vertical columns and 13 horizontal rows, in the document information and detects a set of document components meeting the conditions below. First, the component converting section 105 uses the condition that 9 pieces or more of element identifying information <digit/>, indicating a numerical value, are consecutively arranged from the second column in the first row and followed by consecutively arranged 3 pieces of element identifying information <shorttext/> or <letter/>. Moreover, the component converting section 105 uses the condition that <shorttext/> or <letter/> or <shorttext/> or <letter/> associated with link information is present in the first column in each of the second and third rows.

Another condition is that in each of the second and third rows, 12 or more pieces of element identifying information <digit/> are consecutively arranged from the second column. However, the number of consecutively arranged pieces of element identifying information <digit/> is conditioned to be the number of pieces of element identifying information <digit/> consecutively arranged in the first row plus three. The component converting section 105 may use other conditions to detect a cold game in baseball or a scoreboard showing the progress or the like.

Thus, even if the contents of data in the set of pieces of element identifying information vary day by day, the component converting section 105 can appropriately determine the type of data indicated by the set of pieces of element identifying information to execute a conversion to document components, by determining whether or not the variation conforms to predetermined pattern.

Figure 10:
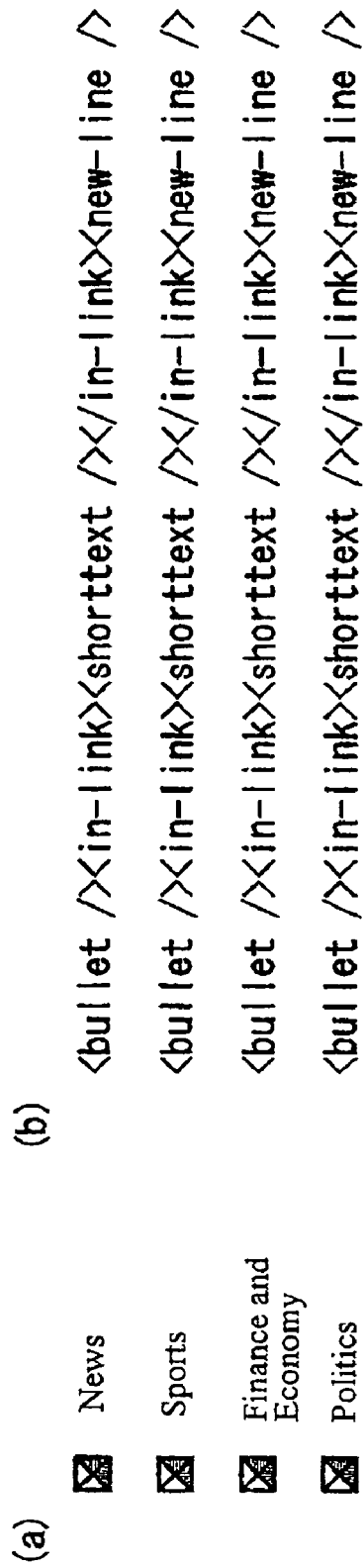
FIG. 10(a) is a view of an example of a display screen displayed by document information, and FIG. 10((b) is a view showing the results of the conversion by an intra-document pattern of sequence converting section 130 of the document information causing the display of the display screen shown in FIG. 10(a)

FIG. 10(a) shows an example of a display screen displayed by document information. FIG. 10(b) shows the results of conversion by the intra-document pattern of sequence converting section 130 of the document information causing the display of the display screen shown in FIG. 10(a).

The display section 205 displays images each indicating the start point of an item and character strings each indicating the contents of the list and associated with the image. For example, the display section 205 displays the strings "News", "Sports", "Finance and Economy", and "Politics" in association with the respective images. Moreover, these strings constitute hyperlinks. Specifically, if the user gives an instruction for any of these strings, the display section 205 displays different information.

The component converting section 105 converts image identifying information identifying an image indicating the start of an item of the list into the element identifying information <bullet/>, indicating the start point of the item. The component converting section 105 also converts a character string to be displayed on the display screen, into the element identifying information <shorttext/>, indicating that the string is composed of 2 or more and 20 or less letters. Moreover, the component converting section 105 converts storage position information indicating a link destination displayed in response to the user's instruction for the string, into the element identifying information <in-link> and </in-link>, indicating that the storage position indicated by the storage position information is in the same site as that of the target document information. The component converting section 105 also converts a document component indicating that the string following the current string is displayed in the next row, e.g. the tag <br>, into the element identifying information <new-line/>, indicating the same.

In this connection, <bullet/>, an example of element identifying information, has only to indicate the start point of an item. It may be composed of an image of the predetermined size shown in the present example or smaller, or <letter/>, <digit/>, or the like which meets particular conditions.

For the target document information converted by the component converting section 105, the intra-document pattern of sequence converting section 130 detects the set of pieces of element identifying information <bullet/>, <in-link>, <shorttext/>, </in-link>, and <new-line/>. Then, if the set of pieces of element identifying information appears repeatedly at a threshold frequency or higher, the intra-document pattern of sequence converting section 130 converts it into element identifying information indicating the pattern of sequence of this set of pieces of element identifying information, e.g. the element identifying information <itemizedlink/>, indicating an item.

For each piece of element identifying information obtained by the conversion by the intra-document pattern of sequence converting section 130, the group classifing section 170 groups the plural document components converted into this element identifying information. For example, the group classifying section 170 labels the document components converted into <itemizedlink/> as a group indicating an item. Preferably, the group classifying section 170 identifies the role of each group obtained, associates the role with the group, and then outputs it. For example, for a group of pieces of link information composed of element identifying information indicating a string containing two or more and a predetermined number (for example, 30) of or less letters, i.e. the element identifying information <shorttext/>, the group classifying section 170 determines that this group is a link list.

Thus, the intra-document pattern of sequence converting section 130 can convert sets of pieces of element identifying information on the basis of the frequency of occurrence and arrangement order of the element identifying information.

In the example shown in the present figure, the intra-document pattern of sequence converting section 130 detects sets of pieces of element identifying information that appear at a frequency higher than the threshold frequency. Alternatively, the component converting section 105 may convert these sets of pieces of element identifying information after determining that they conform to predetermined conditions. For example, the component converting section 105 □□ determines that sets of pieces of element identifing information conform to the predetermined conditions if <bullet/>, <in-link>, <shorttext/>, </in-link>, and <br> are arranged in this order and if such arrangements are consecutively arranged. In this case, the component converting section 105 converts these sets of pieces of element identifying information into <site-index/>, indicating a link list. An example of conditions including the present one will be shown below as a regular expression.

(Regular Expression Indicating a Link List)

[[<bullet/>]? (<samedir-link><shorttext/></samedir-link>)|(<ink-link><shorttext/></in-link>)[<br>|<p>]+]

Thus, □□ the component converting section 105 converts sets of pieces of element identifying information meeting the above conditions into the element identifying information <site-index/>, indicating a link list.

Alternatively, the component converting section 105 may convert a table or list composed of <bullet/>, <in-link>, <shorttext/>, and </in-link>, into <site-index/>, indicating a link list.

FIG. 11(a) shows another example of a display screen displayed by document information. FIG. 11(b) shows the results of conversion by the intra-document pattern of sequence converting section 130 of the document information causing the display of the display screen shown in FIG. 11(a).

The display section 205 displays images each indicating the start point of an item and character strings each indicating the contents of the item and associated with the image. For example, the display section 205 displays a symbol (for example, "•") indicating an item, in association with each string showing the headline of a newspaper article. Moreover, these strings constitute hyperlinks. Specifically, if the user gives an instruction for any of these strings, the display section 205 displays different information.

The component converting section 105 converts each black point indicating the start of an item into the element identifying information <bullet/>, indicating the start point of the item. The component converting section 105 also converts a string to be displayed on the display screen, into the element identifying information <midtext A>, indicating that the string is composed of 30 or more and 100 or less letters. Moreover, the component converting section 105 converts storage position information indicating a link destination displayed in response to the user's instruction for the string, into the element identifying information <in-link> and </in-link>, indicating that the storage position indicated by the storage position information is in the same site as that of the target document information. The component converting section 105 also converts a document component indicating that the string following the current string is displayed in the next row, e.g. the tag <br>, into the element identifying information <new-line/>, indicating the same.

For the target document information converted by the component converting section 105, the intra-document pattern of sequence converting section 130 detects the set of pieces of element identifing information <bullet/>, <in-link>, <midtext >, </in-link>, and <new-line/>. Then, if the set of pieces of element identifying information appears repeatedly at a threshold frequency or higher, the intra-document pattern of sequence converting section 130 converts it into element identifying information indicating the pattern of sequence of this set of pieces of element identifing information, e.g. the element identifing information <long-itemizedlink/>, indicating an item.

For each piece of element identifying information obtained by the conversion by the intra-document pattern of sequence converting section 130, the group classifying section 170 groups the plural document components converted into this element identifying information. For example, the group classifying section 170 labels the document components converted into <longitemizedlink/> as a group indicating an item. Preferably, the group classifying section 170 identifies the role of each group obtained, associates the role with the group, and then outputs it. For example, for a group of pieces of link information composed of element identifying information indicating a string containing letters the number of which is within a predetermined range (for example, between 30 and 100), e.g. <midtext >, the group containing a string at its terminal indicating a time, the group classifying section 170 determines that this group is a headline in a newspaper or the like.

Figure 12:
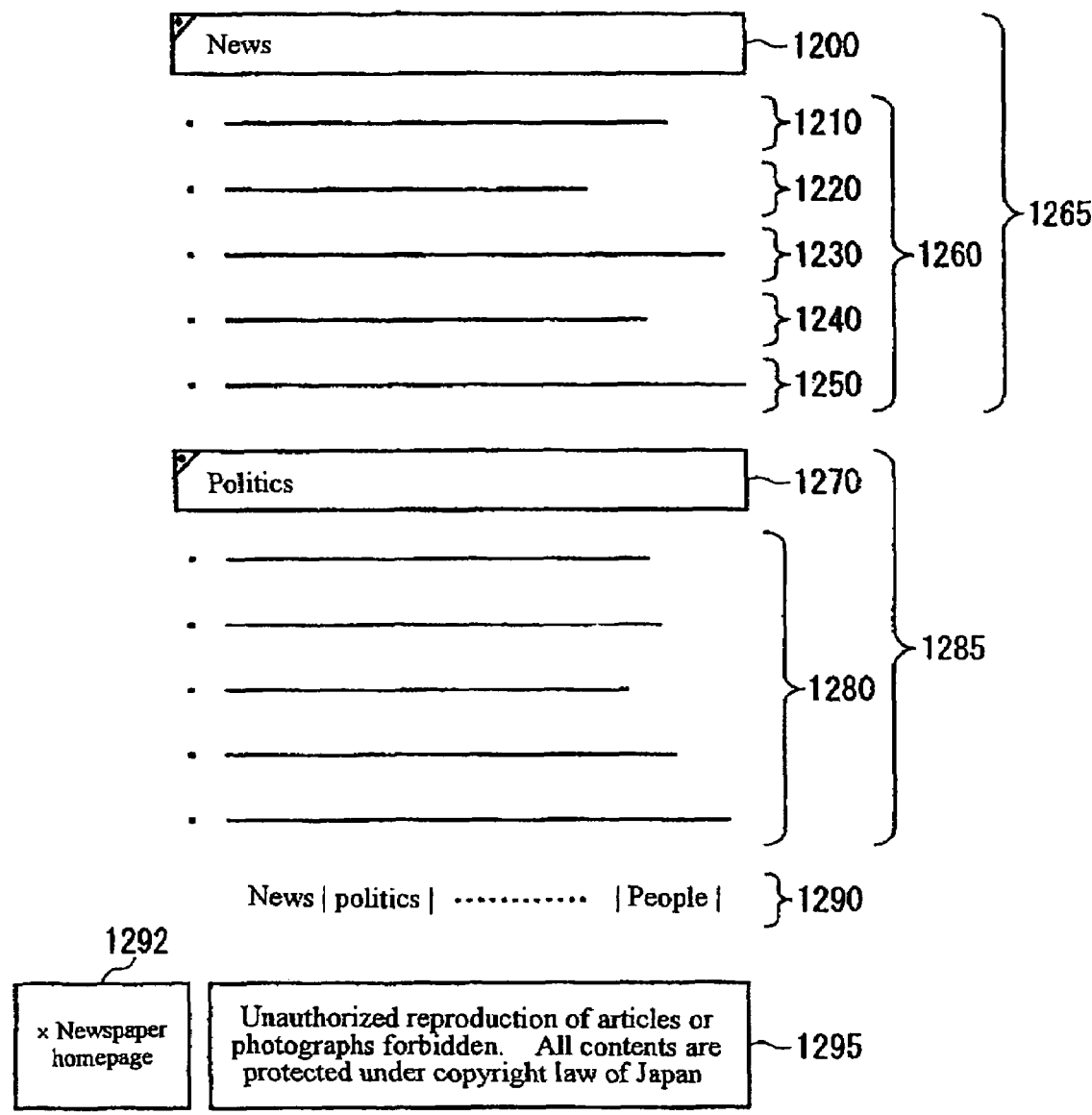
FIG. 12 is a view showing an example of display of target document information to be converted.
Figure 13:
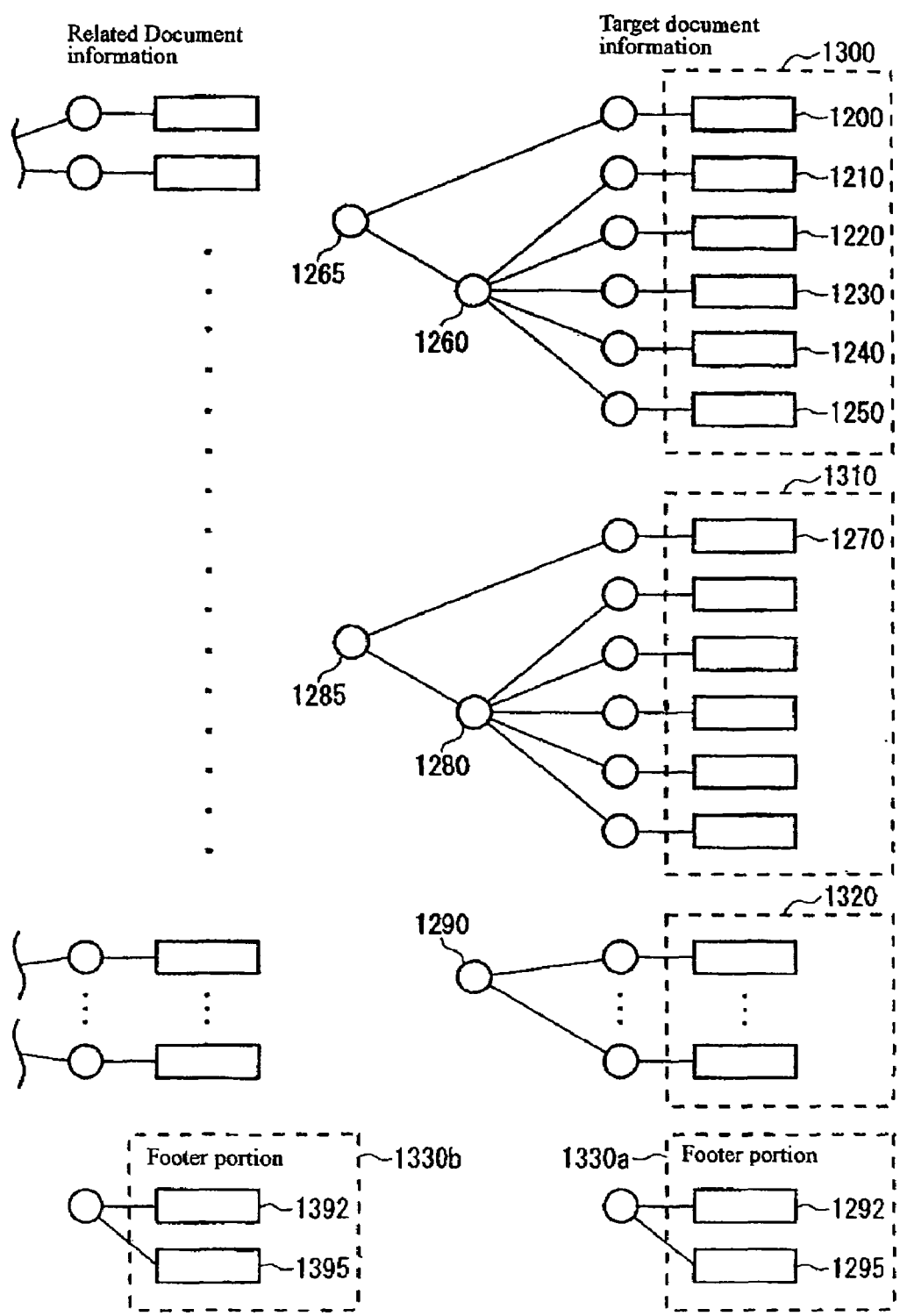
FIG. 13 is a view showing an example of the classification by a group classifying section 170 of the target document information shown in FIG. 12.

FIG. 12 shows an example of display of target document information to be converted. FIG. 13 shows an example of classification by the group classifing section 170 of the target document information shown in FIG. 12. The target document information in FIG. 12 is a HTML document showing newspaper articles. Each solid rectangular in FIG. 13 indicates a document component. Each circle indicates element identifying information. Each area bounded by a dotted line indicates a group obtained by classification by the group classifying section 170. In FIG. 13, an example of classification by the group classifying section 170 is also shown for a part of the related document information.

The information processing apparatus 10 acquires target document information including a set of document components 1200 that causes the display of an object showing general news from a newspaper, a set of document components 1210 each of which is a link to the details of an article about general news and shows the headline of this article, a set of document components 1220, a set of document components 1230, a set of document components 1240, and a set of document components 1250.

For example, the set of document components 1210 contains the document component "•", indicating an item, a document component that is a string indicating the headline of an article, a document component indicating information on a link from this string to a newspaper article, e.g. the tag <a>, and a document component indicating a new line in the strings, e.g. the tag <br>. The sets of document components 1220 to 1250 are each substantially the same as the set of document components 1210. Accordingly, their description is omitted.

The information processing apparatus 10 also acquires target document information including a set of document components 1270 that causes the display of an object showing political news from a newspaper, a set of document components which is a link to the details of an article about political news and shows the headline of this article, a set of document components 1290 that causes the display of a set of links to the respective pages of the newspaper, a document component 1292 indicating the logo of the newspaper, and a document component 1295 indicating the copyright of the newspaper.

The component converting section 105 converts the set of pieces of element identifying information 1200 into element identifying information indicating the genre of a newspaper article. Then, the component converting section 105 converts the set of document components 1210 into the element identifying information <bullet/>, indicating the leading symbol of an item, the element identifying information <midtext>, indicating a string the size of which is within a predetermined range, links to the newspaper article, e.g. the element identifying information <in-link/>, indicating links in a relevant site, and the element identifying information <new-line>, indicating a new line.

Subsequently, the intra-document pattern of sequence converting section 130 converts the set of pieces of element identifying information into the element identifying information <itemizedlink/>, indicating an item. Since the sets of document components 1210 to 1250 are consecutively arranged, the intra-document pattern of sequence converting section 130 also converts the set of pieces of element identifying information <itemizedlink/> into element identifying information 1260 indicating a set of headlines. Moreover, the intra-document pattern of sequence converting section 130 converts the element identifying information 1260 and the element identifying information indicating the genre of the newspaper article, into element identifying information 1265 indicating the headlines of newspaper articles in each genre.

For a newspaper article about political news, the component converting section 105 similarly converts document components such as "•", strings, links, and new lines into element identifying information such as <bullet/>, <midtext>, <in-link/>, and <new-line>. The intra-document pattern of sequence converting section 130 converts these element identifying information to <itemizedlink/>.

Subsequently, the intra-document pattern of sequence converting section 130 converts element identifying information indicating items, e.g. a set of pieces of element identifying information <itemizedlink >, into element identifying information 1280 indicating a set of headline articles. The intra-document pattern of sequence converting section 130 also converts the element identifying information 1280 and element identifying information indicating the genre of the newspaper article, into element identifying information 1285 indicating the headlines of newspaper articles in each genre.

The group classifing section 170 classifies the plural document components converted into the element identifing information 1265 and element identifying information 1285, into groups 1300 and 1310 each indicating the headlines of newspaper articles in each genre.

Furthermore, the information processing apparatus 10 executes the process described below in order to label the set of document components 1290 causing links in the site to be displayed, as a group 1320 indicating the links in the site. First, the component converting section 105 detects "News", "Politics", . . . , "People", each forming a set of document components. Each set of document components has a string that is document components and link information that is a document component. Then, the component converting section 105 converts the string into <shorttext/>, indicating a string with a predetermined number of or less letters. The component converting section 105 also converts the link information into <in-link> and </in-link>, indicating links in the same site. The component converting section 105 also converts a symbol "|" setting strings apart, into <bullet/>.

The intra-document pattern of sequence converting section 130 determines that the set of pieces of element identifying information composed of <in-link>, <shorttext/>, </in-link>, and <bullet/> appears repeatedly at a threshold frequency or higher in the target document information. Thus, the group classifying section 170 can label the set of document components 1295 composed of a string indicating a link list, e.g. a set of pieces of link information arranged in the order of, for example, News, Politics, . . . , and People, as a group indicating a link list.

Furthermore, the information processing apparatus 10 executes the process described below in order to label a string and an image both indicating a footer, as a group 1330a indicating a footer portion. First, the component converting section 105 converts the document component 1295 into the element identifying information <copyright/>, indicating a string containing a predetermined keyword, e.g. a "copyright". Then, the component converting section 105 converts the document component 1292 into the element identifing information <midimage/>, indicating an image the size of which is within a predetermined range.

The inter-document pattern of sequence converting section 160 determines that the set of pieces of element identifing information composed of <copyright/> and <midimage/>appears repeatedly at a threshold frequency or higher in a document containing a combination of the target document information and the related document information. Then, the inter-document pattern of sequence converting section 160 converts this set of pieces of element identifying information into element identifying information indicating the pattern of sequence of this set of pieces of element identifing information.

The group classifying section 170 groups the element identifying information obtained by the conversion by the inter-document pattern of sequence converting section 160. For example, the group classifying section 170 may label the document components 1292 and 1295 in the target document information, as the group 1330a indicating a footer portion. Furthermore, the group classifying section 170 may label document components 1392 and 1395 in the related document information, as a group 1330b indicating a footer portion. Moreover, the group classifying section 170 may determine that title information on these groups is the footer portion, on the basis of the element identifying information contained in these groups, e.g. <copyright/>.

Figure 14:
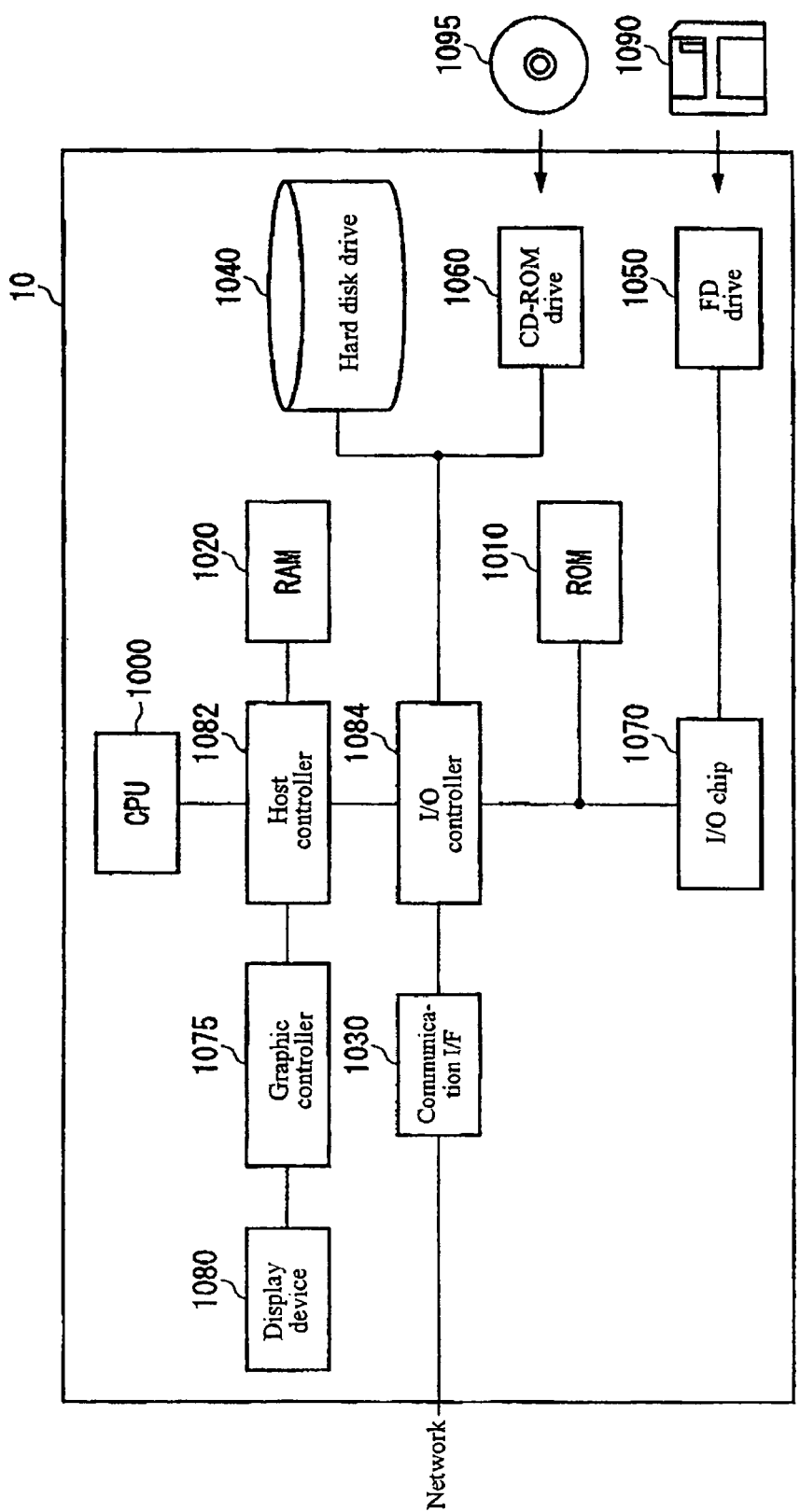
FIG. 14 is a view showing an example of the configuration of hardware in the information processing apparatus 10.

FIG. 14 shows an example of the configuration of hardware in the information processing apparatus 10. The information processing apparatus 10 comprises a CPU periphery section having a CPU 1000, a RAM 1020, a graphic controller 1075, and a display device 1080 connected together by a host controller 1082; an input and output section having a communication interface 1030, a hard disk drive 1040, and a CD-ROM drive 1060 all connected to a host controller 1082 via an input and output controller 1084; and a legacy input and output section having a ROM 1010, a flexible disk drive 1050, an input and output chip 1070 all connected to the input and output controller 1084.

The host controller 1082 connects the RAM 1020 to the CPU 1000 and graphic controller 1075, both of which access the RAM 1020 at a high transfer rate. The CPU 1000 operates on the basis of programs stored in the RAM 1010 and RAM 1020 to control each section. The graphic controller 1075 acquires image data generated by the CPU 1000 or others on a frame buffer provided in the RAM 1020, and displays this data on the display device 1080. Alternatively, the graphic controller 1075 may contain a frame buffer that stores image data generated by the CPU 1000 or others.

The input and output controller 1084 connects the host controller 1082 to the communication interface 1030, hard disk drive 1040, and CD-ROM drive 1060, all of which are relatively fast input and output devices. The communication interface 1030 communicates with other devices via a network. The hard disk drive 1040 stores programs and data used by the information processing apparatus 10. The CD-ROM drive 1060 reads a program or data from the CD-ROM 1095 and provides it to the input and output chip 1070 via the RAM 1020.

Furthermore, the input and output controller 1084 connects to the ROM 1010, the flexible disk drive 1050, the input and output chip 1070, and others, all of which are relatively slow input and output devices. The ROM 1010 stores a boot program executed by the CPU 1000 when the information processing apparatus 10 is activated, programs dependent on the hardware of the image processing apparatus, and the like. The flexible disk drive 1050 reads a program or data from a flexible disk 1090 and provides it to the input and output chip 1070 via the RAM 1020. The input and output chip 1070 connects to the flexible disk 1090 and various input and output devices via, for example, a parallel port, a serial port, a keyboard port, and a mouse port.

A program provided to the information processing apparatus 10 is stored in a recording medium such as the flexible disk 1090, the CD-ROM 1095, or an IC card before provision. The program is read from the recording medium, installed in the information processing apparatus 10 via the input and output chip 107, and then executed in the information processing apparatus 10.

The program installed and executed in the information processing apparatus 10 contains a related document detecting module, a component converting module, a component selecting module, an interstitial component detecting module, an intra-document pattern of sequence converting module, a conversion approval/rejection input module, a repetition processing module, an inter-document pattern of sequence converting module, a group classifying module, a rearrangement output module, a table of contents output module, an audio output instruction generating module, a display module, a document structure information generating module, and a document information identity output module. Operations performed by the information processing apparatus 10 under the control of these modules are identical to the operations of the corresponding members of the information processing apparatus 10, described in FIGS. 1 to 13.

The programs or modules shown above may be stored in an external storage medium. The storage medium may be the flexible disk 1090, the CD-ROM 1095, or an optical recording medium such as a DVD or PD, a magneto-optical recording medium such as an MD, a tape medium, a semiconductor memory such as an IC card, or the like. Alternatively, it is allowable to use as a recording medium a storage device such as a hard disk or a RAM provided in a server system connected to a private communication network or the Internet. In this case, the programs are provided to the image processing apparatus 10 via the network.

As is apparent from the present embodiment, the information processing apparatus 10 groups plural document components contained in document information, on the basis of the frequency of occurrence of the document components. Moreover, the information processing apparatus 10 classifies the document components on the basis of their similarities to related document information. Thus, the information processing apparatus 10 can appropriately classify document components in document information having a dynamically varying structure, e.g. daily updated web pages.

The above embodiments realize the information processing apparatus, program, and recording medium shown in the items below.

As is apparent from the above description, the present invention enables the appropriate classification of information in a document.

The invention claimed is:

1. An information processing apparatus stored on a recording medium that classifies a plurality of document components into a plurality of groups, said information processing apparatus comprising:
a conversion instruction input section for receiving the conversion instructions;
a related document detecting section for related document information having a predetermined relationship with target document information;
a component converting section for converting said target document information and said related document information into element identifying information indicating a document component type;
an inter-document pattern converting section for identifying patterns in said element identifying information which that (a) appear in both said target document information and said related document information; and (b) appear at a first threshold frequency in said element identifying information for indicating;

an intra-document pattern of sequence converting section that selects sets of element identifying information that appear repeatedly at a second threshold frequency or higher as candidates for conversion;

a group classifying section for grouping said identified patterns wherein each group comprises patterns that are identical to each other;

a displaying section for displaying said converted target document information;

an annotation output section for labeling each of the groups of said identified patterns; and a document information identity output section for presenting said labeled groups.

2. The information processing apparatus according to claim 1, further comprising:

a component selecting section that selects element identifying information and processes said document information converted by said component converting section; and an interstitial component detecting section that detects a component arranged between selected document information selected by said component selecting section and said element identifying information which is arranged next to said selected element identifying information in said document information and which is of the same type as that of said selected element identifying information, and wherein said intra-document pattern of sequence detecting section detects said selected information and said interstitial component as element identifying information.

3. The information processing apparatus according to claim 2, wherein said component detecting section further detects a component following selected information in said document information, and said intra-document sequence detecting section detects selected information arranged at an end of said document information.

4. The information processing apparatus according to claim 2, wherein said component selecting section selects said element identifying information from the document information converted by said component converting section, in order of ascending frequency of occurrence, said interstitial component detecting section detects said interstitial component for selected information selected by said component selecting section, and said intra-document pattern of sequence converting section detects, for the selected information sequentially selected by said component selecting section, said selected information and said interstitial component as a set of element identifying information.

5. The information processing apparatus according to claim 1, wherein said intra-document pattern converting section converts the element identifying information appearing repeatedly at the second threshold frequency, into importance information indicating an importance of the sets of element identifying information, and a rearrangement output section that further rearranges document structure information in said groups in order of ascending importance indicated by the importance information.

6. The information processing apparatus according to claim 1, further comprising a group identifying information generating section that generates information identifying each of the groups obtained by the classification by said group classifying section.

7. The information processing apparatus according to claim 1, further comprising an annotation output section that generates and outputs information identifying each of the groups obtained from said group classifying section, said identifying information indicating where in the target document information each document component in a group is located.

8. The information processing apparatus according to claim 1, further comprising a repetition end determining section that processes the sets of the element identifying information to be converted by said intra-document pattern of sequence converting section and thereby exclude sets of element identifying information from target document information for repeated conversions if the total size of the document components converted into the element identifying information reaches a size of information that can be displayed.

9. An information processing apparatus stored on a recording medium, comprising:

a component converting section that:

acquires sets of registered elements indicating a combination of document components to be converted; and converts document components into element identifying information indicating the type or role of the document component;

a component selecting section that selects element identifying information as selected information, in order of ascending frequency of occurrence;

an interstitial component detecting section that:

detects (a) an interstitial component arranged between the selected information and information in the document information that is next to the selected information and which is of the same type as that of the selected information; and (b) a terminal component following a plurality of selected information; and transmits the interstitial component to an intra-document pattern of sequence converting section;

wherein the intra-document pattern of sequence converting section:

generates element identifying information indicating a pattern of sequence of sets of element identifying information that are candidates for conversion;

converts the sets of element identifying information into element identifying information; and detects selected information which is arranged at an end of the document information;

a repetition end determining section that transmits document information to the component selecting section in order to cause the intra-document pattern of sequence converting section to further convert the document information already converted by the intra-document pattern of sequence converting section;

an inter-document pattern of sequence converting section that:

sequentially receives target document information and related document information from the repetition end determining section;

identifies sets of element identifying information that appear in both the target document information and the related document information;

detects identified sets of element identifying information which appear repeatedly at a predetermined threshold frequency or higher in the document containing a combination of the target document information and the related document information; and converts each set of element identifying information that appears repeatedly at the threshold frequency or higher into element identifying information indicating a pattern of sequence of element identifying information; and a group classifying section that receives from the inter-document pattern of sequence of converting section target document information and related document information that has been converted.

10. The information processing apparatus according to claim 9, further comprising a conversion instruction input section that allows a user input whether or not said intra-document pattern of sequence converting section is to execute a conversion into element identifying information, by outputting, to a user the sets of element identifying information.

11. The information processing apparatus according to claim 9, wherein said component converting section converts said document components into said element identifying information in accordance with the data size of the document components.

12. The information processing apparatus according to claim 9, wherein said document information contains image identifying information identifying an image displayed on a display screen, as said document component, and said component converting section converts said image identifying information into said element identifying information indicating the shape of the image identified by said image identifying information.

13. The information processing apparatus according to claim 9, wherein said document information contains, as said document components, display information displayed to the user and storage position information indicating positions where other pieces of information to be displayed in accordance with an instruction for the display information are stored, and said component converting section converts said storage position information into said element identifying information indicating a range of said storage positions in which said other pieces of information are stored.

14. The information processing apparatus according to claim 9, wherein said document information designates information to be displayed on a display screen and contains comment information not displayed on said display screen, and said intra-document pattern of sequence detecting section uses the comment information as information indicating a boundary between sets of element identifying information.

15. The information processing apparatus according to claim 9, wherein said group classifying section generates, for each of the groups obtained by the conversion, title information indicating a role played in said document information by the document components in the group or content information of the document components in the group.

16. The information processing apparatus according to claim 15, further comprising comment information provided at a boundary of the sets of element identifying information, as said title information.

17. The information processing apparatus according to claim 9, wherein said group classifying section further generates, for groups obtained by the conversion, importance information indicating an importance of the groups.

18. An information processing apparatus stored on a recording medium, comprising:

a related document detecting section that detects related document information that has a predetermined relationship with target document information and that is document information stored in a predetermined range from a storage position where the target document information is stored;

a component converting section that:

determines an existence of image identifying information, text data, or link information for conversion into element type information; and determines whether a document component conforms to a predetermined rule; and converts document components into element identifying information indicating contents of the rule;

a group classifying section that:

groups converted document components into corresponding element identifying information;

generates title information indicating (a) a role played in the document information by the document components in a group or contents of the document components in the group; and generates importance information indicating the importance of the group;

a document structure information generating section that generates document structure information indicating the structure of the document information;

an interstitial component detecting section that detects an interstitial component arranged between selected information selected by the component selecting section and information which is arranged in the document information next to the selected information and which is of the same type as that of the selected information, whereby the apparatus can determine whether a set of document components is arranged so as to be displayed to a user in a table form or utilizes the table form to improve the layout of the document information, and can identify the roles of sets of document components.

19. The information processing apparatus according to claim 18, further comprising a table of contents information output section that outputs, for each group obtained from classification by said group classifying section, table of contents information indicating a table of contents for the document components included in the group.

20. The information processing apparatus according to claim 18, further comprising a rearrangement output section that rearranges said plurality of document components according to the groups obtained from classification by said group classifying section.

* * * * *